(12) United States Patent
Coban et al.

(10) Patent No.: US 11,190,758 B2
(45) Date of Patent: Nov. 30, 2021

(54) BLOCK-BASED QUANTIZED RESIDUAL DOMAIN PULSE CODE MODULATION ASSIGNMENT FOR INTRA PREDICTION MODE DERIVATION

(71) Applicant: QUALCOMM Incorporated, San Diego, CA (US)

(72) Inventors: Muhammed Zeyd Coban, Carlsbad, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/854,720

(22) Filed: Apr. 21, 2020

(65) Prior Publication Data

US 2020/0344469 A1    Oct. 29, 2020

Related U.S. Application Data

(60) Provisional application No. 62/838,928, filed on Apr. 25, 2019.

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/186* (2014.11); *H04N 19/46* (2014.11)

(58) Field of Classification Search
None
See application file for complete search history.

(56) References Cited

U.S. PATENT DOCUMENTS

2014/0362917 A1    12/2014  Joshi et al.
2020/0213596 A1*    7/2020  Xu ..................... H04N 19/149
(Continued)

OTHER PUBLICATIONS

Abdoli M., et al., "CE8: BDPCM with Horizontal/vertical Predictor and Independently Decodable Areas (test 8.3.1b)", Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0057, Retrieved from the Internet: URL: http://phenix.int-evry.fr/jvet/doc_end_user/documents/13_Marrakech/wg11/JVET-M0057-v1.zip JVET-M0057.docx. pp. 1-7.
(Continued)

*Primary Examiner* — Frederick D Bailey
(74) *Attorney, Agent, or Firm* — Polsinelli LLP

(57) ABSTRACT

Techniques are described for improving video coding. For example, a first block of a picture included in an encoded video bitstream can be obtained. A second block of the picture can be determined as being coded (e.g., encoded) using a type of block-based quantized residual domain pulse code modulation (BDPCM) mode, such as vertical BDPCM mode or horizontal BDPCM mode. In the event the second block is coded using the vertical BDPCM mode, a vertical intra-prediction mode can be determined for an intra-prediction mode list for the first block. The vertical intra-prediction mode can be added to the intra-prediction mode list for the first block. In the event the second block is coded using the horizontal BDPCM mode, a horizontal intra-prediction mode can be determined for the intra-prediction mode list for the first block and the horizontal intra-prediction mode can be added to the intra-prediction mode list.

41 Claims, 13 Drawing Sheets

(51) Int. Cl.
　　*H04N 19/46* (2014.01)
　　*H04N 19/186* (2014.01)
　　*H04N 19/176* (2014.01)

(56) References Cited

U.S. PATENT DOCUMENTS

2020/0275124 A1* 8/2020 Ko .................... H04N 19/11
2020/0389644 A1* 12/2020 Wang ................. H04N 19/436
2020/0413069 A1* 12/2020 Lim .................... H04N 19/176

OTHER PUBLICATIONS

International Search Report and Written Opinion—PCT/US2020/029264—ISA/EPO—dated Jun. 5, 2020.

Karczewicz (Qualcomm) M., et al., "CE8-related: Quantized residual BDPCM", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0413, Mar. 26, 2019 (Mar. 26, 2019), XP030205010, 5 pages, Retrieved from the Internet: URL: http://phenix.int-evry.fr/jvet/doc_enduser/documents/14_Geneva/wg11/JVET-N0413-v5.zip JVET-N0413_r3.docx. [retrieved on Mar. 26, 2019] pp. 1.2.

Karczewicz (Qualcomm) M., et al., "CE8-related: Quantized Residual BDPCM", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0413, Mar. 26, 2019 (Mar. 26, 2019), XP030205009, 6 pages, Retrieved from the Internet: URL: http://phenix.int-evry.fr/jvet/doc_enduser/documents/14_Geneva/wg11/JVET-N0413-v5.zip JVET-N0413_drafttext_v4.docx. [retrieved on Mar. 26, 2019]—p. 104, paragraph 8.4.2—p. 111, paragraph 8 4.4.

* cited by examiner

510

| | | | | |
|---|---|---|---|---|
| Row 0 | 3 | 5 | 7 | 9 |
| Row 1 | 2 | 4 | 6 | 8 |
| Row 2 | -7 | -5 | -3 | -1 |
| Row 3 | -3 | -1 | 1 | 3 |

620

| | | | | |
|---|---|---|---|---|
| Row 0 | 1 | 2 | 3 | 4 |
| Row 1 | 10 | 11 | 12 | 13 |
| Row 2 | 5 | 6 | 7 | 8 |
| Row 3 | 8 | 9 | 10 | 11 |

| | | | | |
|---|---|---|---|---|
| Row 0 | 1 | 2 | 3 | 4 |
| Row 1 | 9 | 9 | 9 | 9 |
| Row 2 | -5 | -5 | -5 | -5 |
| Row 3 | 3 | 3 | 3 | 3 |

OBTAIN A FIRST BLOCK OF A PICTURE INCLUDED IN AN ENCODED
VIDEO BITSTREAM
1002

DETERMINE A SECOND BLOCK OF THE PICTURE IS CODED USING A
VERTICAL BLOCK-BASED QUANTIZED RESIDUAL DOMAIN PULSE CODE
MODULATION (BDPCM) MODE
1004

DETERMINE, BASED ON THE SECOND BLOCK BEING CODED USING
THE VERTICAL BDPCM MODE, A VERTICAL INTRA-PREDICTION
MODE FOR AN INTRA-PREDICTION MODE LIST FOR THE FIRST BLOCK
1006

ADD THE VERTICAL INTRA-PREDICTION MODE TO THE INTRA-
PREDICTION MODE LIST FOR THE FIRST BLOCK
1008

FIG. 10

BLOCK-BASED QUANTIZED RESIDUAL DOMAIN PULSE CODE MODULATION ASSIGNMENT FOR INTRA PREDICTION MODE DERIVATION

CROSS-REFERENCE TO RELATED APPLICATIONS

This application claims the benefit of U.S. Provisional Application No. 62/838,928, filed Apr. 25, 2019, which is hereby incorporated by reference, in its entirety and for all purposes.

FIELD

This application is related to video coding. More specifically, this application relates to systems, apparatuses, methods, and computer-readable media for assigning intra-prediction modes for block-based Differential Pulse Code Modulation (DPCM) coded blocks.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include versatile video coding (VVC), high-efficiency video coding (HEVC), advanced video coding (AVC), MPEG-2 Part 2 coding (MPEG stands for moving picture experts group), VP9, Alliance of Open Media (AOMedia) Video 1 (AV1), among others. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

SUMMARY

Techniques and systems are described herein for assigning intra-prediction modes for block-based quantized residual domain pulse code modulation (BDPCM) coded blocks (also referred to as block-based differential (or delta) pulse code modulation or residual differential (or delta) pulse code modulation (RDPCM)). Using intra prediction, a coding device (e.g., a video encoder and/or video decoder) can form a prediction block using spatial prediction techniques based on neighboring samples from previously-encoded neighboring blocks within the same picture. The neighboring samples can be identified based on a particular intra-prediction mode being used, such as a Planar mode, a DC mode, and/or one of multiple directional prediction modes (vertical, horizontal, and various angular modes). Residual data can be determined based on the original block and the prediction block. BDPCM coding modes operate similarly as some intra-prediction coding modes, but also include a line-by-line difference determination performed on based on the residual data (e.g., on the transformed and quantized coefficients generated from the residual data). BDPCM modes can include horizontal BDPCM and vertical BDPCM.

Intra-prediction mode coding of a current block to be coded can include generation of a most probable modes (MPM) predictor list. In VVC, there are 67 available intra-prediction modes. A certain number of intra-prediction modes (e.g., five) can be included in the MPM predictor list (referred to as MPM modes), with the remaining modes being referred to as non-MPM modes. The MPM predictor list can be generated for the current block by including intra-prediction modes used for one or more neighboring blocks of the current block in the MPM predictor list. However, when a neighboring block is coded using BDPCM mode, the neighboring block does not have an associated intra-prediction mode that can be added to the MPM list for the current block.

The techniques and systems described herein provide a mapping of different BDPCM modes to different intra-prediction modes. A mapped intra-prediction mode can be included in an MPM predictor list (for a current block) for representing a neighboring block that is coded using a BDPCM mode. For example, a horizontal intra-prediction mode can be included in an MPM predictor list for representing a neighboring block coded using horizontal BDPCM mode, and a vertical intra-prediction mode can be included in an MPM predictor list for representing a neighboring block coded using vertical BDPCM mode.

According to at least one example, a method of decoding video data is provided. The method includes: obtaining a first block of a picture included in an encoded video bitstream; determining a second block of the picture is coded using a vertical block-based quantized residual domain pulse code modulation (BDPCM) mode; determining, based on the second block being coded using the vertical BDPCM mode, a vertical intra-prediction mode for an intra-prediction mode list for the first block; and adding the vertical intra-prediction mode to the intra-prediction mode list for the first block.

In another example, an apparatus for decoding video data is provided that includes a memory configured to store at least one encoded block of the video data, and a video decoder comprising at least one of fixed-function and programmable circuitry. In some examples, the video decoder is configured to: obtain a first block of a picture included in an encoded video bitstream; determine a second block of the picture is coded using a vertical block-based quantized residual domain pulse code modulation (BDPCM) mode; determine, based on the second block being coded using the vertical BDPCM mode, a vertical intra-prediction mode for an intra-prediction mode list for the first block; and add the vertical intra-prediction mode to the intra-prediction mode list for the first block.

In another example, a computer-readable storage medium storing instructions that when executed cause one or more processors of a device for decoding video data to: obtain a first block of a picture included in an encoded video bitstream; determine a second block of the picture is coded using a vertical block-based quantized residual domain pulse code modulation (BDPCM) mode; determine, based on the second block being coded using the vertical BDPCM mode, a vertical intra-prediction mode for an intra-prediction mode list for the first block; and add the vertical intra-prediction mode to the intra-prediction mode list for the first block.

In another example, an apparatus for decoding video data is provided. The apparatus includes: means for obtaining a first block of a picture included in an encoded video bitstream; means for determining a second block of the picture is coded using a vertical block-based quantized residual domain pulse code modulation (BDPCM) mode; means for determining, based on the second block being coded using the vertical BDPCM mode, a vertical intra-prediction mode for an intra-prediction mode list for the first block; and means for adding the vertical intra-prediction mode to the intra-prediction mode list for the first block.

In some aspects, the intra-prediction mode list includes a most probable modes (MPM) list.

In some aspects, the second block is a neighboring block of the first block in the picture.

In some aspects, the method, apparatuses, and computer-readable storage medium described above include: determining, based on information from the encoded video bitstream and based on the intra-prediction mode list, a prediction mode to use for decoding the first block; and decoding the first block using the determined prediction mode. In some examples, the information from the encoded video bitstream includes an intra-prediction mode list flag indicating whether the prediction mode to use for decoding the first block is among a number of prediction modes included in the intra-prediction mode list. In some examples, the method, apparatuses, and computer-readable storage medium described above include: determining, based on a value of the intra-prediction mode list flag, that the prediction mode to use for decoding the first block is among the number of prediction modes included in the intra-prediction mode list; and determining the prediction mode to use for decoding the first block from the intra-prediction mode list.

In some cases, the information in the encoded video bitstream includes an index value associated with the intra-prediction mode list. In some aspects, the method, apparatuses, and computer-readable storage medium described above include determining the prediction mode to use for decoding the first block from the intra-prediction mode list using the index value.

In some aspects, the first block is a luma coding block.

In some aspects, the method, apparatuses, and computer-readable storage medium described above include: obtaining a third block of the picture included in the encoded video bitstream; determining a fourth block of the picture is coded using a horizontal block-based BDPCM mode; determining, based on the fourth block being coded using the horizontal BDPCM mode, a horizontal intra-prediction mode for an intra-prediction mode list for the third block; and adding the horizontal intra-prediction mode to the intra-prediction mode list for the third block.

According to at least one other example, a method of encoding video data is provided. The method includes: encoding a first block of a picture using a vertical block-based quantized residual domain pulse code modulation (BDPCM) mode; obtaining a second block of the picture; determining, based on the first block being encoded using the vertical BDPCM mode, a vertical intra-prediction mode for an intra-prediction mode list for the second block; adding the vertical intra-prediction mode to the intra-prediction mode list for the second block; and generating an encoded video bitstream including the first block, the second block, and the intra-prediction mode list.

In another example, an apparatus for encoding video data is provided that includes a memory configured to store at least one block of the video data, and a video encoder comprising at least one of fixed-function and programmable circuitry. In some examples, the video encoder is configured to: encode a first block of a picture using a vertical block-based quantized residual domain pulse code modulation (BDPCM) mode; obtain a second block of the picture; determine, based on the first block being encoded using the vertical BDPCM mode, a vertical intra-prediction mode for an intra-prediction mode list for the second block; add the vertical intra-prediction mode to the intra-prediction mode list for the second block; and generate an encoded video bitstream including the first block, the second block, and the intra-prediction mode list.

In another example, a computer-readable storage medium storing instructions that when executed cause one or more processors of a device for encoding video data to: encode a first block of a picture using a vertical block-based quantized residual domain pulse code modulation (BDPCM) mode; obtain a second block of the picture; determine, based on the first block being encoded using the vertical BDPCM mode, a vertical intra-prediction mode for an intra-prediction mode list for the second block; add the vertical intra-prediction mode to the intra-prediction mode list for the second block; and generate an encoded video bitstream including the first block, the second block, and the intra-prediction mode list.

In another example, an apparatus for encoding video data is provided. The apparatus includes: means for encoding a first block of a picture using a vertical block-based quantized residual domain pulse code modulation (BDPCM) mode; means for obtaining a second block of the picture; means for determining, based on the first block being encoded using the vertical BDPCM mode, a vertical intra-prediction mode for an intra-prediction mode list for the second block; means for adding the vertical intra-prediction mode to the intra-prediction mode list for the second block; and means for generating an encoded video bitstream including the first block, the second block, and the intra-prediction mode list.

In some aspects, the intra-prediction mode list includes a most probable modes (MPM) list.

In some aspects, the second block is a neighboring block of the first block in the picture.

In some aspects, the method, apparatuses, and computer-readable storage medium described above for encoding video data include: including, in the encoded video bitstream, information indicative of a prediction mode to use for decoding the first block. In some examples, the information includes an intra-prediction mode list flag indicating whether the prediction mode to use for decoding the first block is among a number of prediction modes included in the intra-prediction mode list. In some examples, the information includes an index value indicating the prediction mode from the intra-prediction mode list to use for decoding the first block.

In some aspects, the second block is a luma coding block.

In some aspects, the method, apparatuses, and computer-readable storage medium described above for encoding video data include: encoding a third block of the picture using a horizontal block-based BDPCM mode; obtaining a fourth block of the picture; determining, based on the third block being coded using the horizontal BDPCM mode, a horizontal intra-prediction mode for an intra-prediction mode list for the fourth block; and adding the horizontal intra-prediction mode to the intra-prediction mode list for the fourth block.

In some aspects, the apparatus for decoding video data and/or the apparatus for encoding video data comprises a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus for decoding video data and/or the apparatus for encoding video data includes a camera or multiple cameras for capturing one or more images. In some aspects, the apparatus for decoding video data and/or the apparatus for encoding video data includes a display for displaying one or more images, notifications, and/or other displayable data.

The above-described aspects relating to any of the methods, apparatuses, and computer-readable media can be used individually or in any suitable combination.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 6 is a block diagram illustrating an example of a block resulting from coding of the current block from FIG. 3, in accordance with some examples;

FIG. 7 is a block diagram illustrating an example of a block resulting from coding of the current block from FIG. 3, in accordance with some examples;

FIG. 10 is a flow diagram illustrating an example of a process of decoding video data, in accordance with some examples;

DETAILED DESCRIPTION

Figure 1:
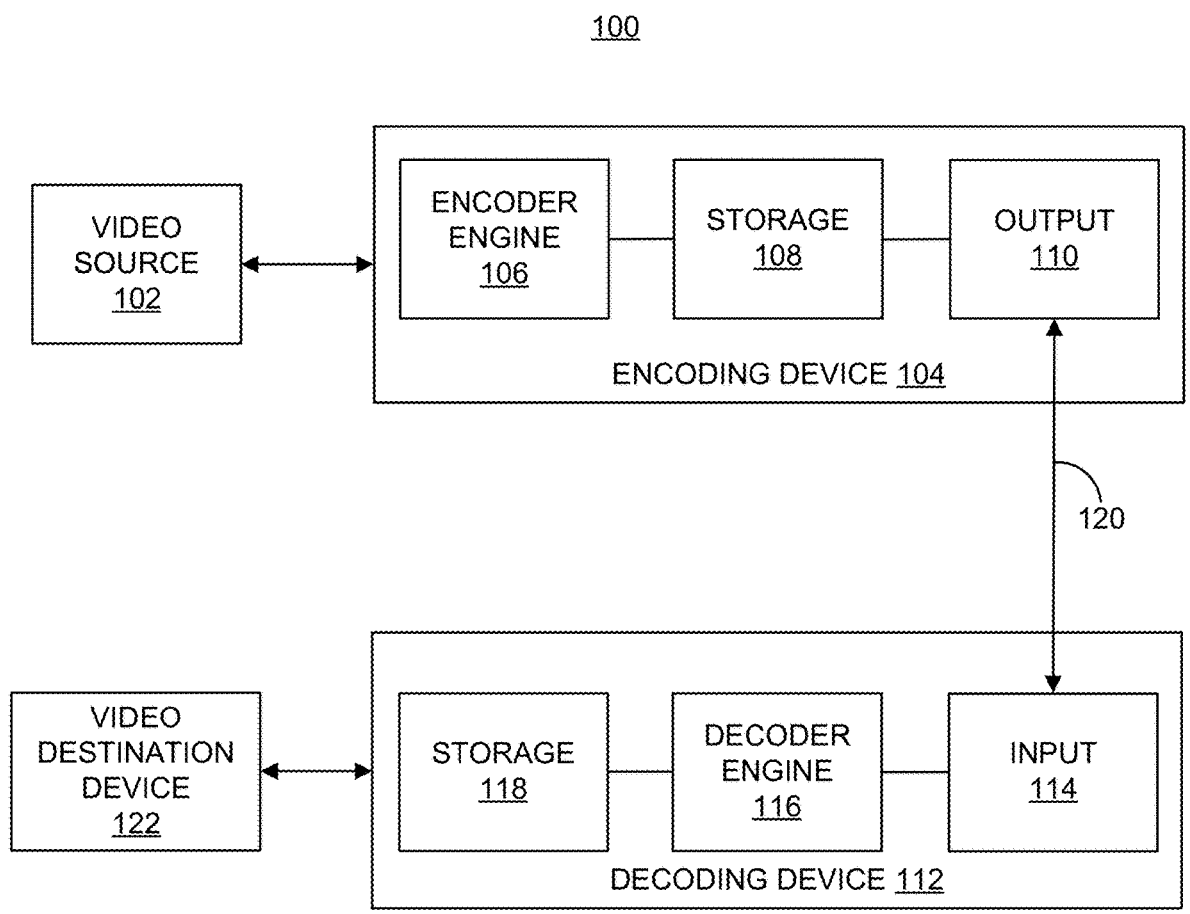
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. As used herein, a video coding device can refer to a video encoder, a video decoder, or a combined video encoder-decoder (referred to as a CODEC). Video compression techniques can include applying different prediction modes, including spatial prediction (referred to as intra prediction or intra-frame prediction), temporal prediction (referred to inter-prediction or inter-frame prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction error can be determined as the difference between the pixel values in the block being encoded and the predicted block. The prediction error can also be referred to as the residual. The video encoder may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

As described in more detail below, systems, apparatuses, methods (also referred to as processes), and computer-readable media are described herein that are related to assigning intra-prediction modes for block-based quantized residual domain pulse code modulation (BDPCM) coded blocks. BDPCM coding modes are similar to intra-prediction, but also include a line-by-line difference determination performed on the transformed and quantized coefficients generated from the residual data. BDPCM modes can include horizontal BDPCM and vertical BDPCM.

In some cases, intra-prediction mode coding of a block currently being coded (referred to as a current block) can include generation of a most probable modes (MPM) predictor list. A certain number of intra-prediction modes can be included in the MPM predictor list (referred to as MPM modes), with the remaining modes being referred to as non-MPM modes. The techniques and systems described herein provide a mapping of one or more BDPCM modes to one or more intra-prediction modes, and including a mapped intra-prediction mode in an MPM predictor list for a current block.

In some examples, the techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), VP9, AV1, and/or other video coding standard in development or to be developed. In some cases, the techniques described herein can be performed for image-based compression (e.g., Joint Photographic Experts Group (JPEG) coding and/or other image coding technique).

FIG. 1 is a block diagram illustrating an example of a system 100 including an encoding device 104 and a decoding device 112. The encoding device 104 may be part of a source device, and the decoding device 112 may be part of a receiving device (also referred to as a client device). The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), or any other suitable electronic device.

The components of the system 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 100 is shown to include certain components, one of ordinary skill will appreciate that the system 100 can include more or fewer components than those shown in FIG. 1. For example, the system 100 can also include, in some instances, one or more memory devices other than the storage 108 and the storage 118 (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 1.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (WET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9 and Alliance of Open Media (AOMedia) Video 1 (AV1) are other video coding standards for which the techniques described herein can be applied.

Many embodiments described herein can be performed using video codecs such as VTM, VVC, HEVC, AVC, and/or extensions thereof. However, the techniques and systems described herein may also be applicable to other coding standards, such as MPEG, Joint Photographic Experts Group (JPEG) (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a Random Access Skipped Leading (RASL) picture flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 intra-prediction modes specified in HEVC are indexed as shown in Table 1 below. In other examples, more intra modes may be defined including prediction angles that may not already be represented by the 33 angular modes.

TABLE 1

Specification of intra prediction mode and associated names

| Intra-prediction mode | Associated name |
|---|---|
| 0 | INTRA_PLANAR |
| 1 | INTRA_DC |
| 2 ... 34 | INTRA_ANGULAR2 ... INTRA_ANGULAR34 |

Figure 2:
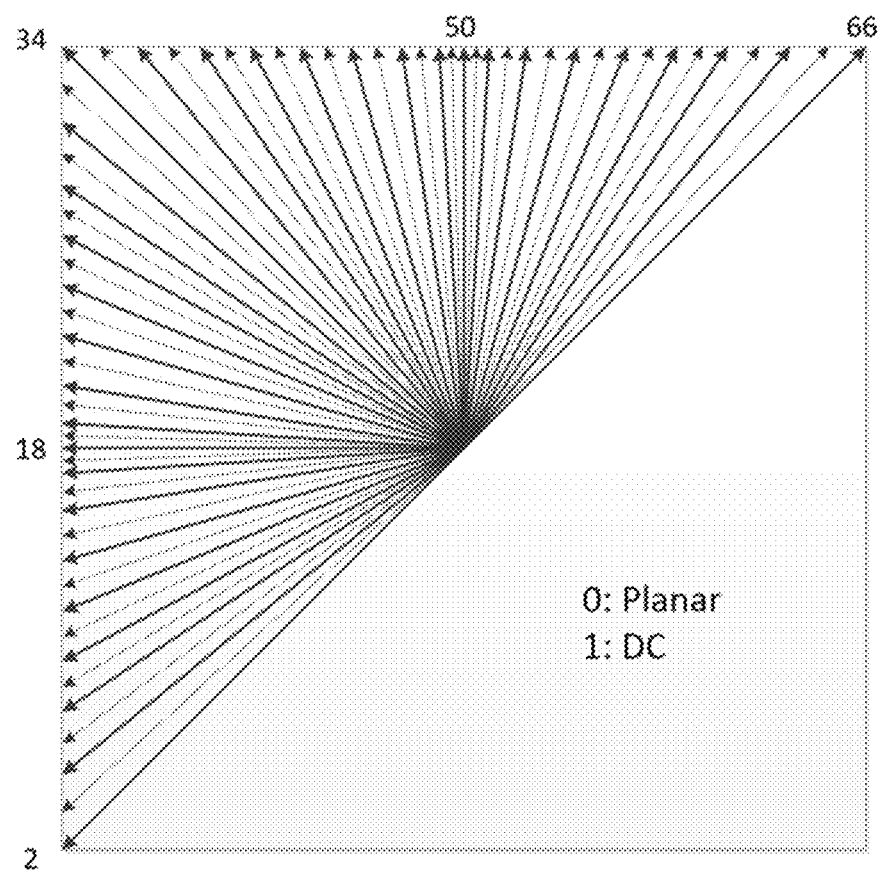
FIG. 2 is a diagram providing an example illustration of intra-prediction modes associated with the versatile video coding (VVC) Standard, in accordance with some examples.

In other examples, the prediction angles associated with the angular modes may be different from those used in HEVC. For instance, 67 intra-prediction modes are specified in VVC, as shown in FIG. 2 and in Table 2 below. In some cases, the intra prediction modes INTRA_LT_CCLM, INTRA_L_CCLM and INTRA_T_CCLM are only applicable to chroma components.

TABLE 2

Specification of intra prediction mode and associated names

| Intra prediction mode | Associated name |
|---|---|
| 0 | INTRA_PLANAR |
| 1 | INTRA_DC |
| 2 ... 66 | INTRA_ANGULAR2 ... INTRA_ANGULAR66 |
| 81 ... 83 | INTRA_LT_CCLM, INTRA_L_CCLM, INTRA_T_CCLM |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $\Delta y_0$, refIdx$_0$ and $\Delta x_1$, $\Delta y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $\Delta y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform (DCT), discrete sine transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes) implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). As previously noted, the residual data may correspond to pixel difference values between pixels of the unencoded picture and prediction values corresponding to the PUs. The encoder engine 106 may form one or more TUs including the residual data for a CU (which includes the PUs), and may then transform the TUs to produce transform coefficients for the CU. The TUs may comprise coefficients in the transform domain following application of a block transform.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients (also referred to as transform coefficient levels), prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), ultra-wideband (UWB), WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony. An example of specific details of the encoding device 104 is described below with reference to FIG. 12. An example of specific details of the decoding device 112 is described below with reference to FIG. 13.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

In some implementations, a video coder (e.g., a video encoder, video decoder, or combined encoder-decoder or CODEC) can utilize a block-based pulse code modulation (PCM) mode on a residual block, which can be referred to as block-based quantized residual domain PCM (BDPCM) or residual differential (or delta) PCM (RDPCM). BDPCM prediction modes are separate from intra-prediction modes. FIG. 2 is a diagram providing an example illustration of the 67 intra-prediction modes associated with VVC, shown as modes 0-66. Mode 0 is the Planar mode, Mode 1 is the DC mode, and Modes 2-66 are angular modes. As described above, a residual signal (or residual block) can be generated by subtracting the prediction signal from a current block signal (corresponding to the prediction error). The residual signal is thus the portion of the original signal that could not be predicted by a selected predictor. The video coder can predict a residual block from neighboring samples in the vertical or horizontal direction. Once the residual block is determined, transform and quantization can be applied to generate quantized coefficients.

Using a BDPCM mode, the video coder can modify the values of a row or column of quantized coefficients based on the values in the previous row or column. BDPCM modes can include horizontal BDPCM and vertical BDPCM. In one illustrative example of vertical BDPCM, the video coder can keep the first row (referred to as row 0) of the block of quantized coefficients as-is. For the second row (row 1) of the block, the video coder can subtract the values in row 0 from the values of row 1 (e.g., subtract the first value of row 0 from the first value of row 1, subtract the second value of row 0 from the second value of row 1, and so forth). The video coder can subtract the values in row 1 from the values of row 2 for the third row (row 2) of the block, the values in row 2 from the values of row 3 for the fourth row (row 3) of the block, and so on. Subtraction can refer to determining values equal to the result of subtracting, and can be performed by subtracting or adding a negative of a value. The video coder can signal the transformed and quantized residual values for row 0, the difference values for row 1, the difference values for row 2, and so on.

Figure 3:
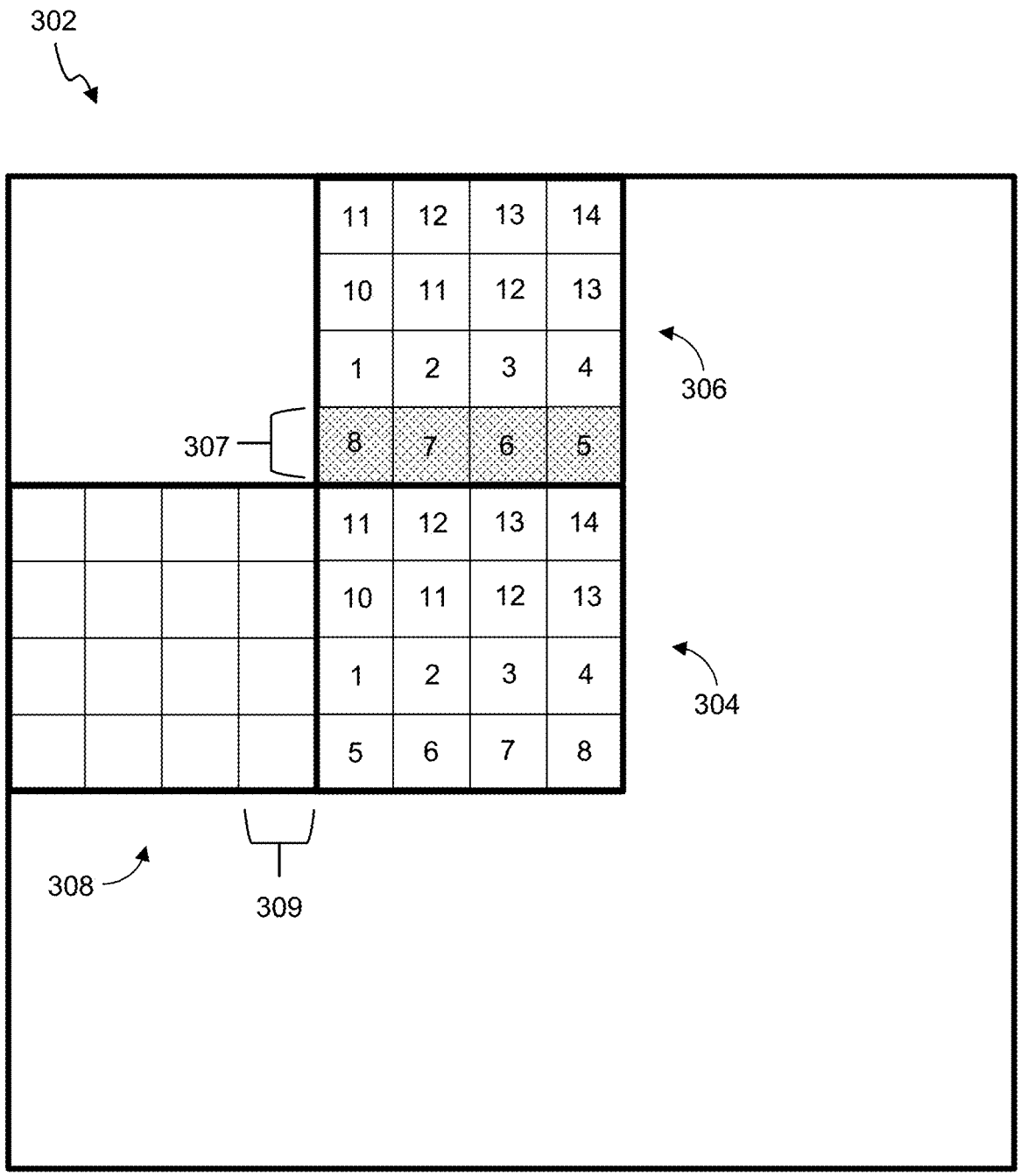
FIG. 3 is a block diagram illustrating an example of a picture including a current block being coded using a block-based quantized residual domain pulse code modulation (BDPCM) mode, in accordance with some examples.

FIG. 3 is a block diagram illustrating an example of a picture 302 including a current block 304 being coded by an encoding device (e.g., encoding device 104, or a CODEC including the encoding device 104) using a vertical BDPCM mode. A first neighboring block of the current block 304 is shown above the current block (referred to as an above-neighboring block 306) and a second neighboring block of the current block 304 is shown to the left of the current block (referred to as a left-neighboring block 308). Using the vertical BDPCM mode, the current block can be predicted from a bottom row 307 of the above-neighboring block 306. For example, a residual block (representing the residual signal) can be generated for the current block 304 using the bottom row of the above-neighboring block 306. In the event horizontal BDPCM were used, the current block can be predicted from a right-most column 309 of the left-neighboring block 308.

Figures 4A, 4B:
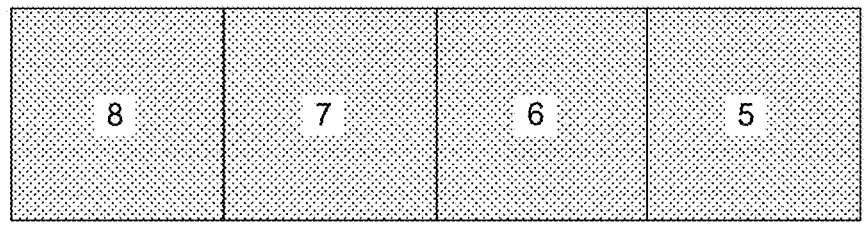
FIG. 4A is a block diagram illustrating an example of a row of a neighboring block used for coding a current block, in accordance with some examples.
FIG. 4B is a block diagram illustrating the current block from FIG. 3, in accordance with some examples.
Figure 5:
FIG. 5 is a block diagram illustrating an example of a block resulting from coding of the current block from FIG. 3, in accordance with some examples.

FIG. 4A is a diagram illustrating the bottom row 307 of the above-neighboring block 306 with various values, and FIG. 4B is a diagram illustrating the current block 304 with various values. The values in the bottom row 307 and the values in the current block 304 represent sample values (e.g., luma values, chroma values, or luma and chroma values). FIG. 5 is a diagram illustrating an example of a residual block 510 generated for the current block 304 using the bottom row 307 of the above-neighboring block 306. Using the vertical BDPCM mode, the bottom row 307 of the above-neighboring block 306 is subtracted from every line in the current block 304 to obtain the residual block 510. For example, the bottom row 307 is subtracted from the first row (referred to as row 0) of the current block 304 to determine the first row (row 0) of the residual block 510. The first value 8 in the bottom row 307 is subtracted from the first value 11 in row 0 of the current block 304 to obtain a value of 3, which is included as the first value of the residual block 510. The second value 7 in the bottom row 307 is subtracted from the second value 12 in row 0 of the current block 304 to obtain a value of 5 that is included as the second value of the residual block 510. The third value 6 in the bottom row 307 is subtracted from the third value 13 in row 0 of the current block 304 to obtain a value of 7 that is included as the third value of the residual block 510. The fourth value 5 in the bottom row 307 is subtracted from the fourth value 14 in row 0 of the current block 304 to obtain a value of 9 that is included as the fourth value of the residual block 510. Similar calculations are made to determine the values in the second row (row 1), the third row (row 2), and the fourth row (row 3) of the residual block 510.

The encoding device can perform a transform on the residual block 510 and can quantize the transformed values to determine final quantized transform coefficient values to code. The quantized transform coefficients can be referred to as transform coefficient levels or as levels. Details regarding the transform and quantization are described above with respect to FIG. 1 and with respect to FIG. 12 and FIG. 13 below. FIG. 6 is a diagram illustrating an example of a block 620 with quantized transform coefficients resulting from transforming and quantizing the values in the residual block 510. In normal intra-prediction modes (e.g., intra-prediction modes 0-66 shown in FIG. 2), the encoding device would code the quantized transform coefficients as they are (e.g., by performing entropy coding of the quantized transform coefficients, such as using context adaptive binary arithmetic coding (CABAC) or other entropy coding technique).

Figure 7:
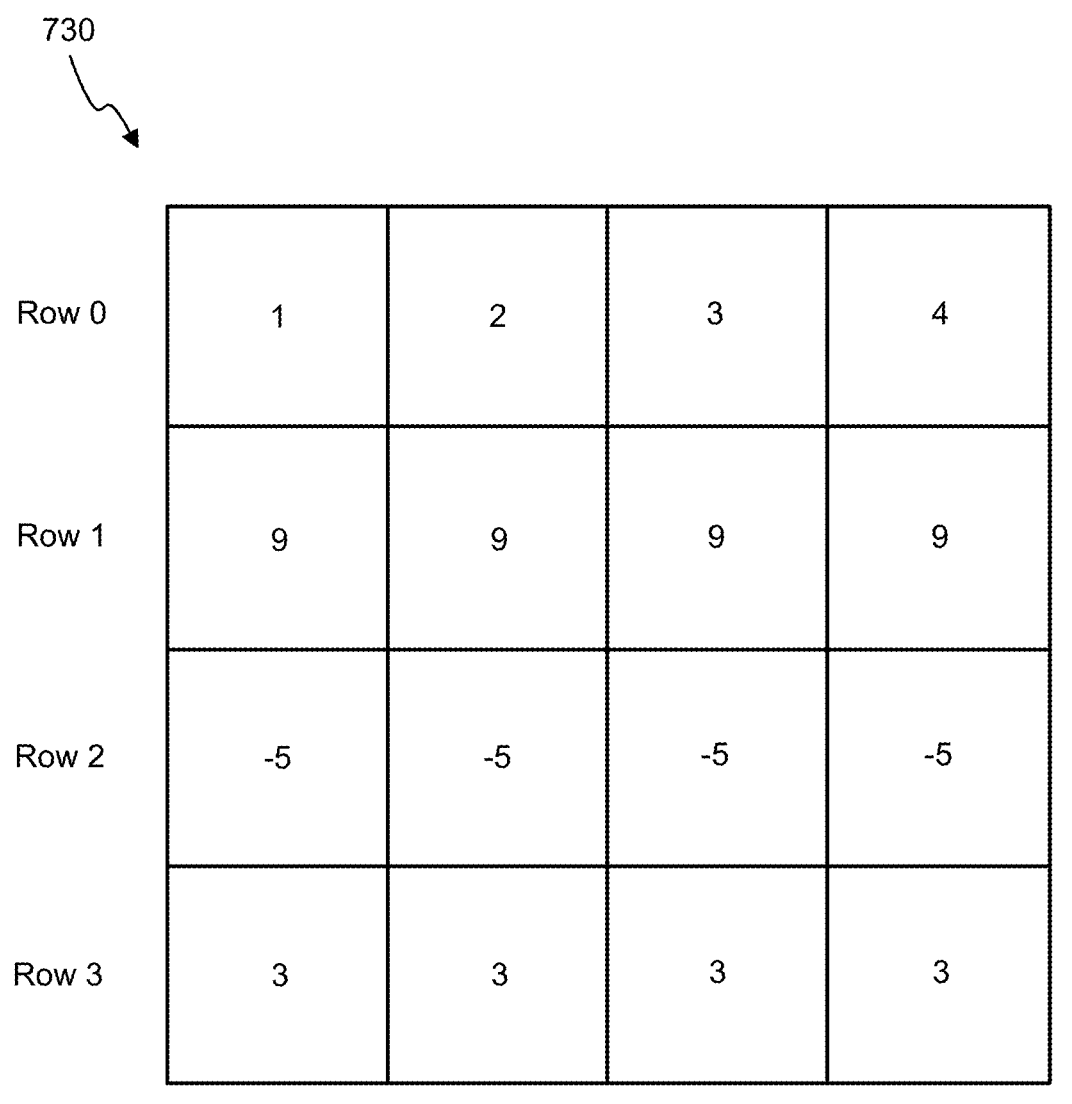

When performing PDPCM, an additional prediction is performed on the quantized transform coefficients. As noted above, the encoding device can modify the values of a row or column of quantized coefficients based on the values in the previous row or column. FIG. 7 is a diagram illustrating an example of a block 730 including values determined from the block 620 of quantized transform coefficients using vertical BDPCM. The first row (referred to as row 0) of the block 620 of quantized transform coefficients is not changed and is kept as-is in the block 730. For example, as shown in FIG. 7, row 0 of the block 730 includes the values 1, 2, 3, and 4, which are the same values as row 0 of the block 620. For the second row (row 1) of the block 730, the encoding device subtracts the values in row 0 of the block 620 from the values in row 1 of the block 620. For example, the first value 1 in row 0 of block 620 is subtracted from the first value 10 in row 1 of the block 620 to obtain a value of 9, which is included as the first value in row 1 of the 730. The second value 2 in row 0 of block 620 is subtracted from the second value 11 in row 1 of the block 620 to obtain a value of 9 that is included as the second value in row 1 of the 730. The third value 3 in row 0 of block 620 is subtracted from the third value 12 in row 1 of the block 620 to obtain a value of 9 that is included as the third value in row 1 of the 730. The fourth value 4 in row 0 of block 620 is subtracted from the fourth value 13 in row 1 of the block 620 to obtain a value of 9 that is included as the fourth value in row 1 of the 730. As a result, the second row (row 1) in the block 730 includes values 9, 9, 9, and 9.

Similar calculations are made to determine the values in the third row (row 2) and the fourth row (row 3) of the block 730. For example, the third row (row 2) of the block 730 is determined by subtracting the values in row 1 of the block 620 from the values in row 2 of the block 620, and the third row (row 3) of the block 730 is determined by subtracting the values in row 2 of the block 620 from the values in row 3 of the block 620. The encoding device can then code the values in block 730 (e.g., by performing entropy coding of the quantized transform coefficients, such as using context adaptive binary arithmetic coding (CABAC) or other entropy coding technique). The coded values can be included in the encoded video bitstream and stored and/or transmitted for reception by a device for decoding. A decoding device can perform the reverse process as that described above to perform BDPCM for decoding a block that was encoded using BDPCM.

BDPCM prediction modes are signalled separately from the signaling of intra-prediction modes. Various syntax elements and variables associated with BDPCM prediction modes can be signaled by an encoding device and used by a decoding device to determine whether to decode a block using a BDPCM mode. For example, syntax elements and/or variables can be signaled indicating whether a block uses BDPCM mode along with syntax elements and/or variables indicating a direction of the BDPCM prediction (e.g., horizontal or vertical). Intra-prediction mode signaling utilizes predictors to signal intra-prediction modes that can be used for coding a block. In some examples, the predictors can be signaled in a most probable modes (MPM) predictor list (also referred to as an MPM list). As shown in FIG. 2, VVC specifies 67 available intra-prediction modes. A certain number of the intra-prediction modes (e.g., five in VVC, three in HEVC, or other suitable number) can be included in the MPM list. The intra-prediction modes included in the MPM list are referred to as MPM modes. The remaining modes (other than the MPM modes) are referred to as non-MPM modes. In some cases, the MPM list can be specified as an array candModeList[ ].

MPM list generation is performed using the same process at the encoder and the decoder. For example, the encoding device and the decoding device can independently generate an MPM list for a block. The encoding device can signal information that the decoder can use to select an intra-prediction mode for the block from the MPM modes (in the MPM list) or from the non-MPM modes. In some cases, MPM generation is only specified for intra prediction of luma samples. For example, MPM generation is only specified in VVC for intra prediction of luma samples (not chroma). In other cases, MPM generation can be specified and performed for luma samples and chroma samples.

The most probable modes in the MPM list can be considered "special" because they are signaled differently from the rest of the modes. The MPM modes are stored for a block in the MPM list because they are signaled separately. In VVC, Planar mode has been "excluded" from the MPM list; but Planar mode is also signaled separately from the remaining prediction modes (e.g., the other intra-prediction modes). Although the Planar mode is not included in the MPM list per se, it can be considered as a most probable mode.

For each block that is coded (encoded or decoded), a list of most probable modes may be defined. A block being coded is referred to as a current block. As noted above, in VVC, Planar mode is not included in the MPM list that is generated, and does not count toward the number of most probable modes in the MPM list. One or more of the predictors to include in the MPM list for a current block can be derived from intra-prediction modes used for one or more neighboring blocks that are neighboring the current block. For example, two neighboring blocks neighboring the current block can be chosen to use for derivation of modes to include in the MPM list for the current block. The locations of the blocks can be defined relative to the current block. For example, a first neighboring block of the current block can include a block above the current block (referred to as an above-neighboring block) and a second neighboring block of the current block can include a block to the left of the current block (referred to as a left-neighboring block). In one illustrative example, a total of five modes can be included in an MPM list for a block, and two of the five modes are modes of the two neighboring blocks. In some cases, if both of the modes of the neighboring blocks are identical, they will only count towards one entry in the MPM list.

Figure 8:
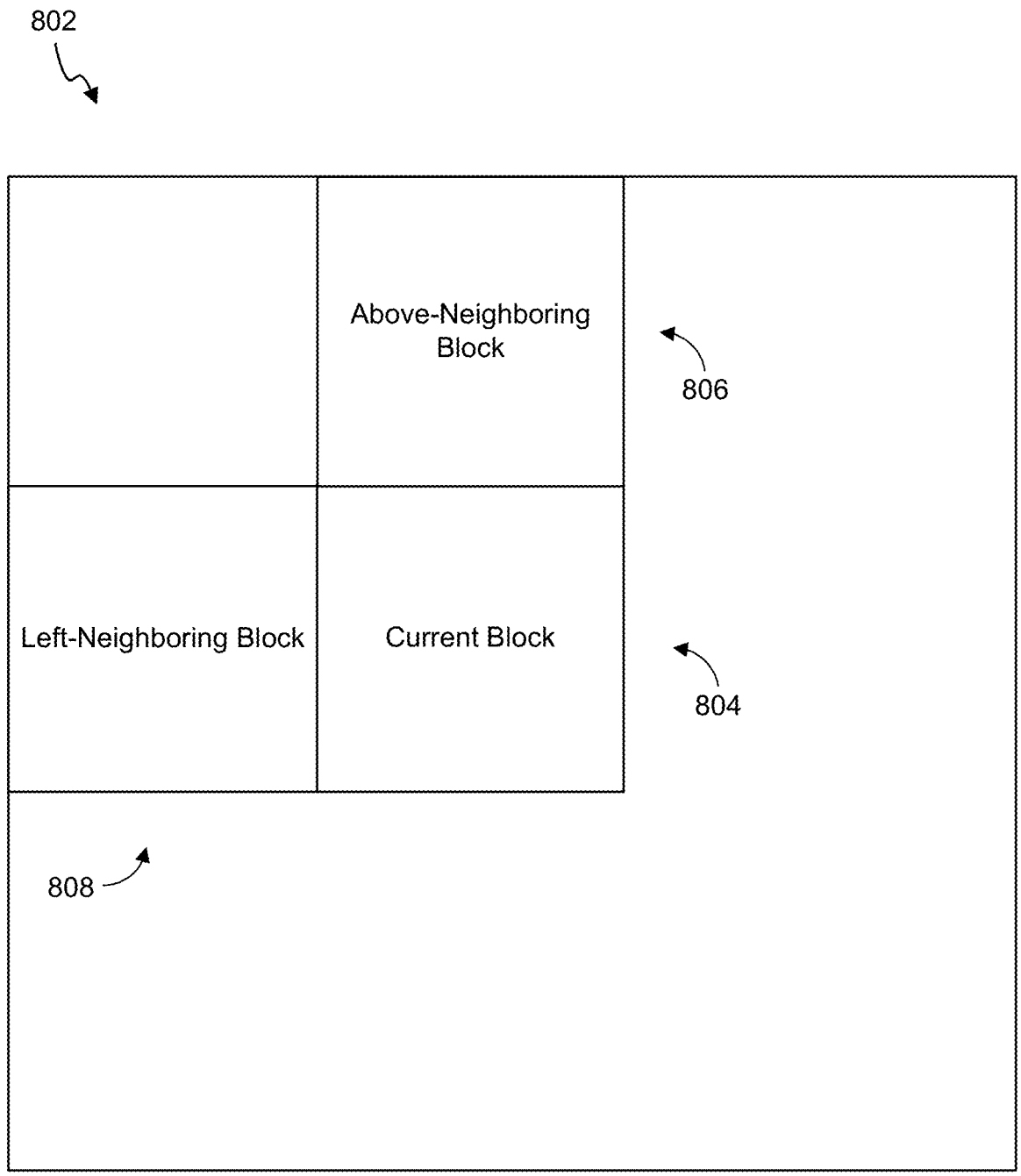
FIG. 8 is a block diagram illustrating an example of a picture including a current block being coded, in accordance with some examples.

FIG. 8 is a diagram illustrating an example of a picture 802 including a current block 804 being coded (encoded or decoded). Referring to FIG. 8 as an illustrative example, when generating an MPM list for the current block 804, the above-neighboring block 806 and the left-neighboring block 808 can be selected to use for derivation of predictors for the MPM list for the current block 804. In some cases, one intra-prediction mode each representative of the two neighboring blocks (e.g., the above-neighboring block 806 and the left-neighboring block 808) can be chosen as predictors for the MPM list for the current block (e.g., the current block 804). In some examples, if a neighboring block is coded with a regular intra-prediction mode (e.g., one of the 67 intra-prediction modes shown in FIG. 2), then that intra-prediction mode is chosen as the representative mode for the neighboring block to include in the MPM list for the current block. In such examples, if a neighboring block is coded with a coding mode other than a regular intra-prediction mode (e.g., coded using matrix intra prediction (MIP), inter-prediction, intra block copy (IBC), BDPCM, unavailable, or other non-intra-prediction mode), a representative mode is chosen based on certain rules. In one illustrative example, when a mode of a neighboring block is unavailable, such as MIP-coded or not intra-coded (e.g., inter, IBC, etc.), then the representative intra-prediction mode for the neighboring block can be set to be Planar or other default mode. As described below, if the neighboring block is coded using BDPCM, there may be an intra-prediction mode specified for the neighboring block (e.g., horizontal, vertical, etc.) that will be used for the MPM list.

In some implementations, one or more intra-prediction modes (e.g., DC mode, referred to as Mode 0 in FIG. 2) can always be included in the MPM list at some location (e.g., as the first entry in the MPM list). For example, in VVC, DC mode is included in the MPM list (e.g., always included in an MPM at some location). The remaining MPM modes of the MPM for a block can be derived from the neighboring modes and/or other default modes. For example, a coding device (e.g., an encoding device and/or decoding device) can determine nearby modes of the modes of the neighboring blocks for the filling the MPM list for a block. For instance, if x and y are neighboring modes of blocks A and B, respectively, then x+1, x−1, y+1, y−1, x+2, etc. can be included in the MPM list. In one illustrative example, if x is intra-prediction mode 36, then x+1 is intra-prediction mode 37, x−1 is intra-prediction mode 35. A set of steps can be used to determine which modes would be added, for example as specified in the VVC standard. In some cases, default modes can include vertical intra-prediction mode (mode 50), horizontal intra-prediction mode (mode 18), or other modes that can be added to the MPM list. An underlying assumption of the derivation can be that repetitions in the MPM list are avoided.

In one example, based on two modes from two neighboring blocks, the DC mode, and two modes derived from the neighboring modes, five modes are included in the MPM list for the current block. In some cases, other numbers of intra-prediction modes can be included in an MPM list (e.g., three intra-prediction modes according to HEVC).

When encoding a current block, an encoding device chooses an intra-prediction mode (e.g., Planar, DC, or an angular mode) for which to encode the current block. For example, as described below, the encoding device can select one of a plurality of possible coding modes, such as one of a plurality of intra-prediction coding modes or one of a plurality of inter-prediction coding modes, for a current block based on error results (e.g., coding rate and the level of distortion, or the like). If the chosen mode belongs to the MPM list, then an intra-prediction mode list flag is set to true (e.g., with a value of 1). In one illustrative example, the intra-prediction mode list flag can be denoted as an intra_luma_mpm_flag. When the intra-prediction mode list flag is set to true (e.g., intra_luma_mpm_flag equal to 1), a value of a Planar flag indicating whether the intra-prediction mode is not Planar mode is signaled depending on whether the chosen mode is Planar. The Planar flag can be denoted as intra_luma_not_planar_flag, where a true value (e.g., equal to 1) of the intra_luma_not_planar_flag indicates the MPM mode is not Planar mode and where a false value (e.g., equal to 0) indicates the MPM mode is Planar mode. If the MPM mode is not Planar mode (e.g., intra_luma_not_planar_flag equal to 1), an index to the MPM list can be signaled in the encoded video bitstream. The index associated with the MPM list can be denoted as intra_luma_mpm_idx and can indicate the MPM mode from the MPM list that is to be used for the current block. If the chosen mode does not belong to the MPM list, the intra-prediction mode list flag (e.g., an intra_luma_mpm_flag) is set to false (e.g., with a value of 0) and a non-MPM index to the non-MPM intra-prediction mode is signaled in the encoded video bitstream.

With respect to the decoder, for a current block being decoded, the intra-prediction mode list flag (e.g., intra_luma_mpm_flag) can be obtained from the encoded video bitstream. As noted above, the intra-prediction mode list flag (e.g., intra_luma_mpm_flag) specifies to the decoder whether or not the selected intra-prediction mode is among those in MPM list. In some cases, a decoder may choose not to derive an MPM list for a block if the intra-prediction mode list flag (e.g., intra_luma_mpm_flag) is set to false. If the intra-prediction mode list flag is set to true (e.g., intra_luma_mpm_flag equal to 1), the Planar flag (e.g., intra_luma_not_planar_flag) and/or the index to the MPM list (e.g., intra_luma_mpm_idx) are used to select the mode from the MPM list. For example, if the Planar flag has a false value (e.g., intra_luma_not_planar_flag equal to 0), the decoder can determine the MPM mode is the Planar mode. If the Planar flag has a true value (e.g., intra_luma_not_planar_flag equal to 1), the decoder can determine the MPM mode is not Planar mode and can refer to the index (e.g., intra_luma_mpm_idx) to the MPM list to determine which MPM mode in the MPM list to choose for decoding the current block. If the intra-prediction mode list flag is set to false (e.g., intra_luma_mpm_flag equal to 0), the non-MPM index can be used by the decoder to derive the non-MPM intra-prediction mode to use for decoding the current block.

As described above, intra-prediction modes applied to one or more neighboring blocks neighboring a current block can be used as MPM intra-prediction modes in the MPM list for the current block. However, when a neighboring block is coded using BDPCM mode and not an intra-prediction mode (e.g., not one of the VVC 67 intra-prediction modes shown in FIG. 2), there is no intra-prediction mode associated with the neighboring block that can be added to the MPM list for the current block. For intra-mode derivation purposes, a block encoded using a BDPCM mode may require an intra-prediction mode assigned to it for derivation of one or more intra-prediction mode predictors for future coded blocks. For instance, when encoding or decoding a current block, a coding device (e.g., an encoding device, a decoding device, or a CODEC) can assign an intra-prediction mode to a neighboring block (neighboring the current block) that is coded using a BDPCM mode, and can include the assigned intra-prediction mode in an MPM list for the current block. Some techniques assign a first element of a predictor list (e.g., a first entry in an MPM list) as the intra-prediction mode to assign to a BDPCM coded block. In some cases, Planar mode, DC mode, or other mode may be considered as the first entry in the MPM list.

Systems, methods, apparatuses, and computer-readable media are described herein for assigning intra-prediction modes for BDPCM coded blocks. A mapping of different BDPCM modes to different intra-prediction modes can be provided. For example, a horizontal intra-prediction mode (e.g., mode 18) can be mapped to a horizontal BDPCM mode, and a vertical intra-prediction mode (e.g., mode 50) can be mapped to a vertical BDPCM mode. Using such mapping, a horizontal intra-prediction mode can be assigned to a block coded using horizontal BDPCM mode, and a vertical intra-prediction mode can be assigned to a block coded using vertical BDPCM mode. In some cases, PLANAR mode and/or DC mode can be assigned to BDCPM coded blocks.

The mapping between intra-prediction modes and BDPCM modes can be used to derive predictor lists (e.g., MPM lists) for future coded blocks. For instance, an intra-prediction mode assigned to a BDPCM coded block can be included in a predictor list (e.g., an MPM list) for a current block. In one example, based on a mapping between a horizontal intra-prediction mode and a horizontal BDPCM mode, the horizontal intra-prediction mode can be included in an MPM predictor list for a current block to represent a neighboring block coded using horizontal BDPCM mode. In another example, based on a mapping between a vertical intra-prediction mode and a vertical BDPCM mode, the vertical intra-prediction mode can be included in an MPM predictor list for a current block to represent a neighboring block coded using vertical BDPCM mode.

Figure 9:
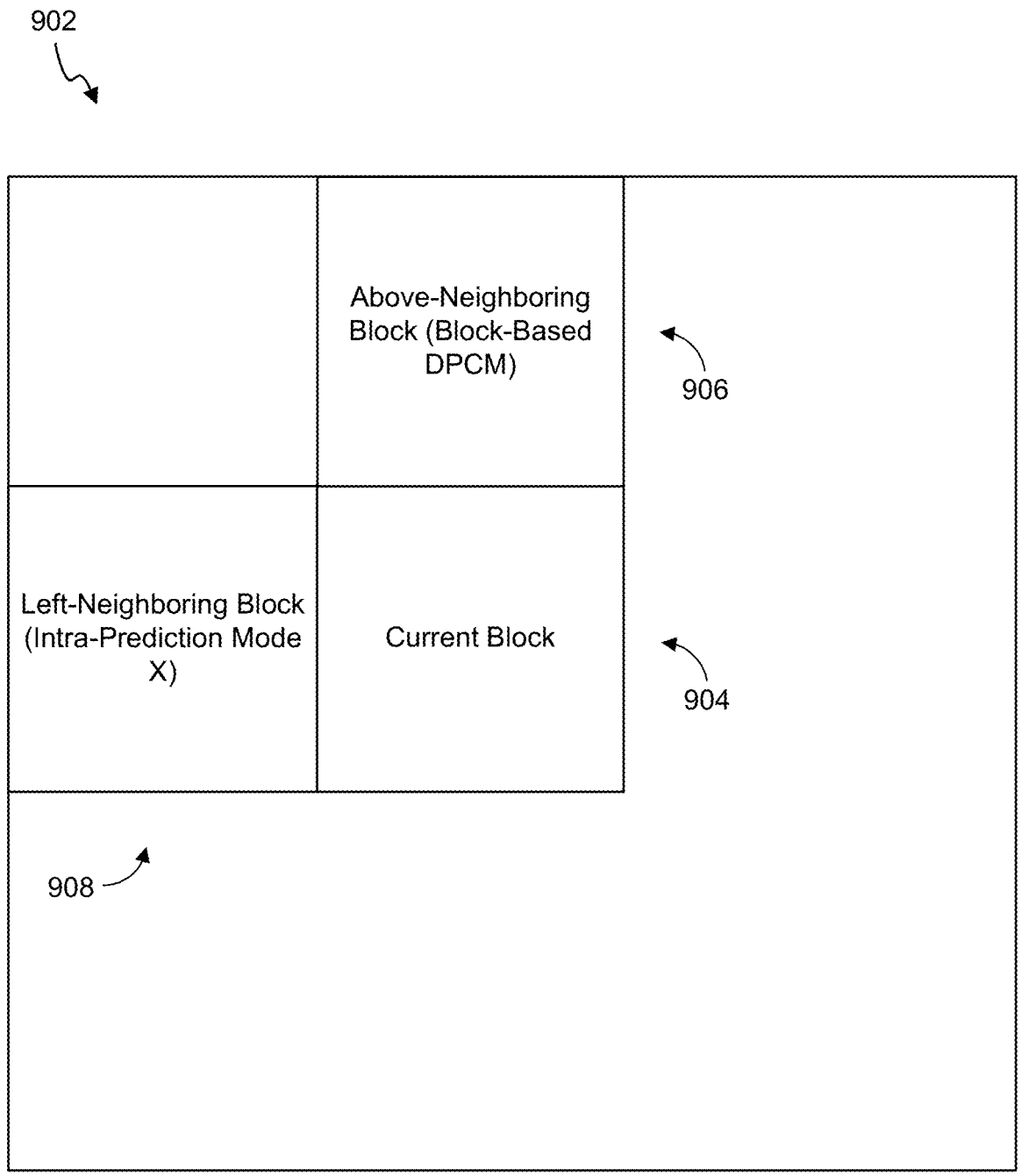
FIG. 9 is a block diagram illustrating an example of a picture including a current block being coded, in accordance with some examples.

FIG. 9 is a diagram illustrating an example of a picture 902 including a current block 904 being coded (e.g., encoded by an encoding device or decoded by a decoding device). When generating an MPM list for the current block 904, the above-neighboring block 906 and the left-neighboring block 908 can be selected to use for deriving predictors for the MPM list for the current block 904. As shown, an intra-prediction mode X was used to code (encode or decode) the left-neighboring block 908. The intra-prediction mode X can include, for example, any of the intra-67 prediction modes shown in FIG. 2. The intra-prediction mode X can be added to the MPM list for the current block 904.

As shown in FIG. 9, BDPCM was used to code (encode or decode) the above-neighboring block 906. In one illustrative example, the BDPCM mode used to code the above-neighboring block 906 is a horizontal BDPCM mode. In such an example, the horizontal BDPCM mode can be mapped to a horizontal intra-prediction mode (e.g., mode 18 from FIG. 2) for representing the above-neighboring block 906. The horizontal intra-prediction mode representing the above-neighboring block 906 can be added to the MPM list for the current block 904. In another illustrative example, the BDPCM mode used to code the above-neighboring block 906 is a vertical BDPCM mode. In such an example, the vertical BDPCM mode can be mapped to a vertical intra-prediction mode (e.g., mode 50 from FIG. 2) for representing the above-neighboring block 906. The vertical intra-prediction mode representing the above-neighboring block 906 can be added to the MPM list for the current block 904. In some implementations, one or more other intra-prediction modes can also be included in the MPM list for the current block 904. For example, DC mode can be included in the MPM list for the current block 904 in some cases.

In some cases, the horizontal BDPCM mode can be mapped to a horizontal intra-prediction mode (e.g., mode 18 from FIG. 2) for representing a neighboring block because the properties of a block that may cause horizontal BDPCM mode to be selected for application to the block are similar to the properties of a block that may cause horizontal intra-prediction mode to be selected for application to the block. Based on the properties of the block, the block would be best suited for prediction using the horizontal intra-prediction mode (in the event horizontal BDPCM mode were not available). In some cases, the vertical BDPCM mode can be mapped to a vertical intra-prediction mode (e.g., mode 18 from FIG. 2) for representing a neighboring block because the properties of a block that may cause vertical BDPCM mode to be selected for application to the block are similar to the properties of a block that may cause vertical intra-prediction mode to be selected for application to the block. Based on the properties of the block, the block would be best suited for prediction using the vertical intra-prediction mode (in the event vertical BDPCM mode were not available).

In some implementations, a coding device (e.g., an encoding device, a decoding device, or a CODEC) can apply an intra-sub-partition (ISP) mode in addition to the regular or tree partitioning structures. For example, a picture can be split into coding units or blocks using a QTBT structure or MTT structure, and a coding unit or coding block can be further split using ISP. In the ISP mode, the two or more partitions resulting from splitting the coding block share the same intra-prediction mode. For example, the two or more partitions of a coding block can be encoded or decoded separately (e.g., in a sequential order) but the same intra-prediction mode is used for each of the two or more partitions. For example, in some implementations, if the ISP mode is enabled or chosen to be applied for a coding block, then the coding block can be partitioned and the same intra-prediction mode can be applied to each of the partitions. In some implementations, BDPCM coded blocks can be treated as non-ISP mode coded blocks. For example, blocks coded using BDPCM may not be coded using the ISP mode.

FIG. 10 is a flowchart illustrating an example of a process 1000 of decoding video data using techniques described herein. In some examples, process 1000 is performed by a decoding device (e.g. decoding device 112). In other examples, process 1000 can be implemented as instructions in a non-transitory storage medium that cause a device to perform process 1000 when processors of the device execute the instructions. In some cases, when the process 1000 is performed by a video decoder, the video data can include a coded picture or a portion (e.g., one or more blocks) of the coded picture included in an encoded video bitstream or can include multiple coded pictures included in the encoded video bitstream.

At block 1002, the process 1000 includes obtaining a first block of a picture included in an encoded video bitstream. In some implementations, the first block is a luma coding block (e.g., including luma samples and no chroma samples). In some implementations, the first block is a chroma coding block (e.g., including chroma samples and no luma samples). In some implementations, the first block is a coding block including luma samples and chroma samples.

At block 1004, the process 1000 includes determining a second block of the picture is coded using a vertical block-based quantized residual domain pulse code modulation (BDPCM) mode. As described herein, the second block can be a neighboring block of the first block in the picture. In one illustrative example referring to FIG. 9, the first block can include the current block 904 and the second block can be the neighboring block 906.

At block 1006, the process 1000 includes determining, based on the second block being coded using the vertical BDPCM mode, a vertical intra-prediction mode for an intra-prediction mode list for the first block. At block 1008, the process 1000 includes adding the vertical intra-prediction mode to the intra-prediction mode list for the first block. In some aspects, the intra-prediction mode list includes a most probable modes (MPM) list.

In some examples, the process 1000 includes determining, based on information from the encoded video bitstream and based on the intra-prediction mode list, a prediction mode to use for decoding the first block. The process 1000 can decode the first block using the determined prediction mode. In some implementations, the information from the encoded video bitstream includes an intra-prediction mode list flag indicating whether the prediction mode to use for decoding the first block is among a number of prediction modes included in the intra-prediction mode list. If the prediction mode that is to be used for decoding the first block belongs to the intra-prediction mode list, then the intra-prediction mode list flag can be set to true (e.g., with a value of 1). In one illustrative example, the intra-prediction mode list flag can be denoted as an intra_luma_mpm_flag. In some examples, the process 1000 includes determining, based on a value of the intra-prediction mode list flag, that the prediction mode to use for decoding the first block is among the number of prediction modes included in the intra-prediction mode list (e.g., based on the intra-prediction mode list flag have a value of 1). Based on determining that the prediction mode to use for decoding the first block is among the number of prediction modes included in the intra-prediction mode list, the process 1000 can determine the prediction mode to use for decoding the first block from the intra-prediction mode list. As described above, if the mode does not belong to the intra-prediction mode list, the intra-prediction mode list flag (e.g., an intra_luma_mpm_flag) is set to false (e.g., with a value of 0) and a non-MPM index to a non-MPM intra-prediction mode can be signaled in the encoded video bitstream.

In some implementations, the information in the encoded video bitstream includes an index value associated with the intra-prediction mode list. For example, the information can include the intra-prediction mode list flag and the index value. In one illustrative example, the index associated with the intra-prediction mode list can be denoted as intra_luma_mpm_idx and can indicate the prediction mode from the intra-prediction mode list that is to be used for the first block. The process 1000 can include determining the prediction mode to use for decoding the first block from the intra-prediction mode list using the index value.

In some examples, the process 1000 includes obtaining a third block of the picture included in the encoded video bitstream, and determining a fourth block of the picture is coded using a horizontal block-based BDPCM mode. In such examples, the process 1000 includes determining, based on the fourth block being coded using the horizontal BDPCM mode, a horizontal intra-prediction mode for an intra-prediction mode list for the third block, and adding the horizontal intra-prediction mode to the intra-prediction mode list for the third block.

Figure 11:
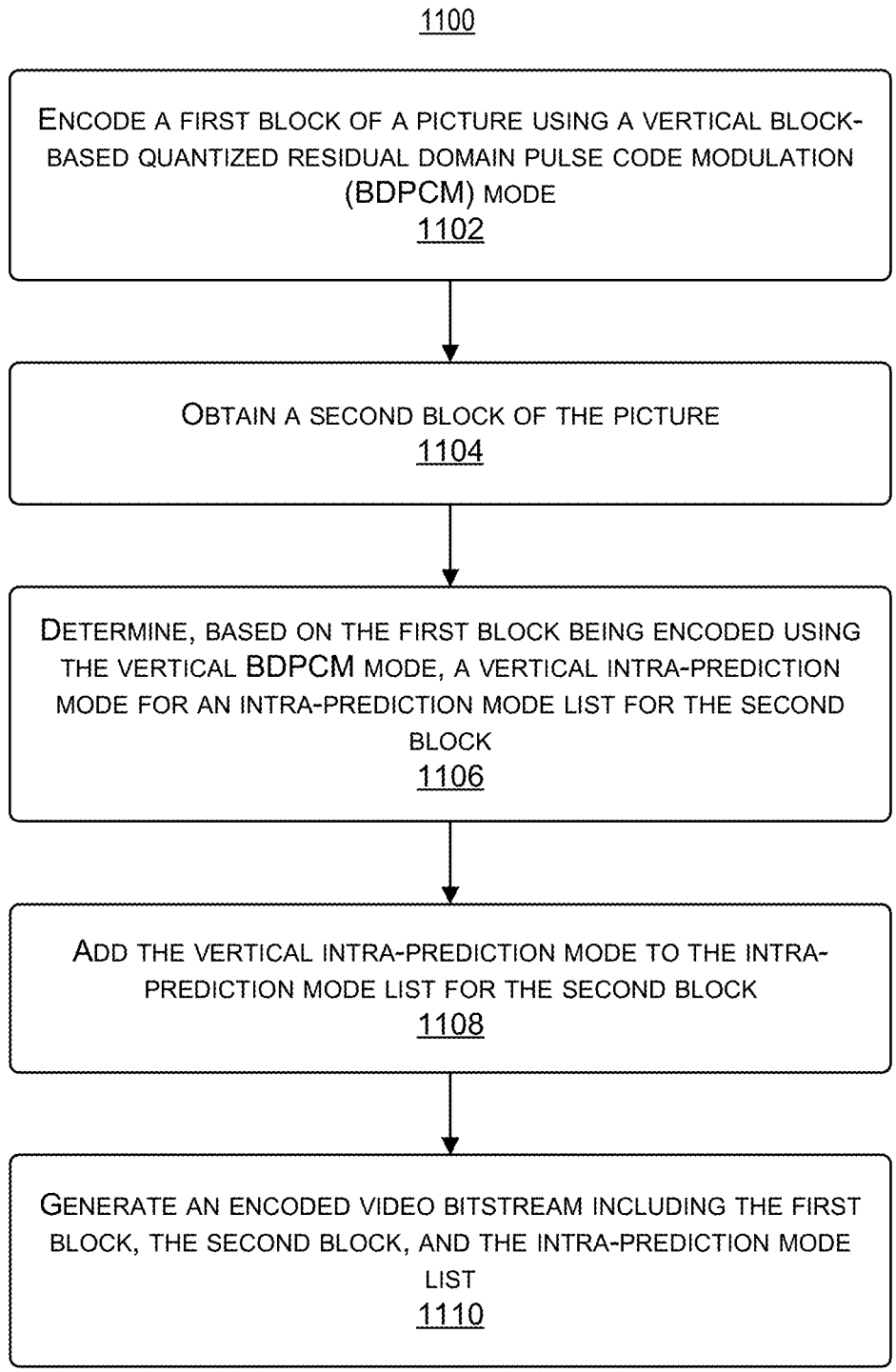
FIG. 11 is a flow diagram illustrating an example of a process of encoding video data, in accordance with some examples.

FIG. 11 is a flowchart illustrating an example of a process 1100 of encoding video data using techniques described herein. In some examples, process 1100 is performed by an encoding device (e.g. encoding device 104). In other examples, process 1100 can be implemented as instructions in a non-transitory storage medium that cause a device to perform process 1100 when processors of the device execute the instructions. In some cases, when the process 1100 is performed by a video encoder, the video data can include a picture or a portion (e.g., one or more blocks) of the picture to be encoded in an encoded video bitstream or can include multiple pictures to be encoded in the encoded video bitstream.

At block 1102, the process 1100 includes encoding a first block of a picture using a vertical block-based quantized residual domain pulse code modulation (BDPCM) mode. At block 1104, the process 1100 includes obtaining a second block of the picture. In some aspects, the second block is a luma coding block (e.g., including luma samples and no chroma samples). In some implementations, the second block is a chroma coding block (e.g., including chroma samples and no luma samples). In some implementations, the second block is a coding block including luma samples and chroma samples. As described herein, the first block can be a neighboring block of the second block in the picture. In one illustrative example referring to FIG. 9, the second block can include the current block 904 and the first block can be the neighboring block 906.

At block 1106, the process 1100 includes determining, based on the first block being encoded using the vertical BDPCM mode, a vertical intra-prediction mode for an intra-prediction mode list for the second block. At block 1108, the process 1100 includes adding the vertical intra-prediction mode to the intra-prediction mode list for the second block. In some examples, the intra-prediction mode list includes a most probable modes (MPM) list. At block 1110, the process 1100 includes generating an encoded video bitstream including the first block, the second block, and the intra-prediction mode list.

In some examples, the process 1100 includes including, in the encoded video bitstream, information indicative of a prediction mode to use for decoding the first block. In some examples, the information includes an intra-prediction mode list flag indicating whether the prediction mode to use for decoding the first block is among a number of prediction modes included in the intra-prediction mode list. If the prediction mode that is to be used for decoding the first block belongs to the intra-prediction mode list, then the intra-prediction mode list flag can be set to true (e.g., with a value of 1). As described above, if the mode does not belong to the intra-prediction mode list, the intra-prediction mode list flag (e.g., an intra_luma_mpm_flag) is set to false (e.g., with a value of 0) and a non-MPM index to a non-MPM intra-prediction mode can be included in the encoded video bitstream. In one illustrative example, the intra-prediction mode list flag can be denoted as an intra_luma_mpm_flag.

In some examples, the information includes an index value indicating the prediction mode from the intra-prediction mode list to use for decoding the first block. For example, the information can include the intra-prediction mode list flag and the index value. In one illustrative example, the index associated with the intra-prediction mode list can be denoted as intra_luma_mpm_idx and can indicate the prediction mode from the intra-prediction mode list that is to be used for the second block.

In some aspects, the process 1100 includes encoding a third block of the picture using a horizontal block-based BDPCM mode, and obtaining a fourth block of the picture. In such examples, the process 1100 includes determining, based on the third block being coded using the horizontal BDPCM mode, a horizontal intra-prediction mode for an intra-prediction mode list for the fourth block, and adding the horizontal intra-prediction mode to the intra-prediction mode list for the fourth block.

In some implementations, the processes (or methods) described herein, including processes 1000 and 1100, can be performed by a computing device or an apparatus, such as the system 100 shown in FIG. 1. For example, the process 1000 can be performed by the decoding device 112 shown in FIG. 1 and FIG. 13 and/or by another client-side device, such as a player device, a display, or any other client-side device. As another example, the process 1100 can be performed by the encoding device 104 shown in FIG. 1 and FIG. 12 and/or by another video source-side device or video transmission device.

In some cases, the computing device or apparatus may include one or more input devices, one or more output devices, one or more processors, one or more microprocessors, one or more microcomputers, and/or other component(s) that is/are configured to carry out the steps of the processes described herein. In some examples, the computing device may be or may include a mobile device, a desktop computer, a server computer and/or server system, or other type of computing device. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 1000 and 1100 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein, including processes 1000 and 1100, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 12:
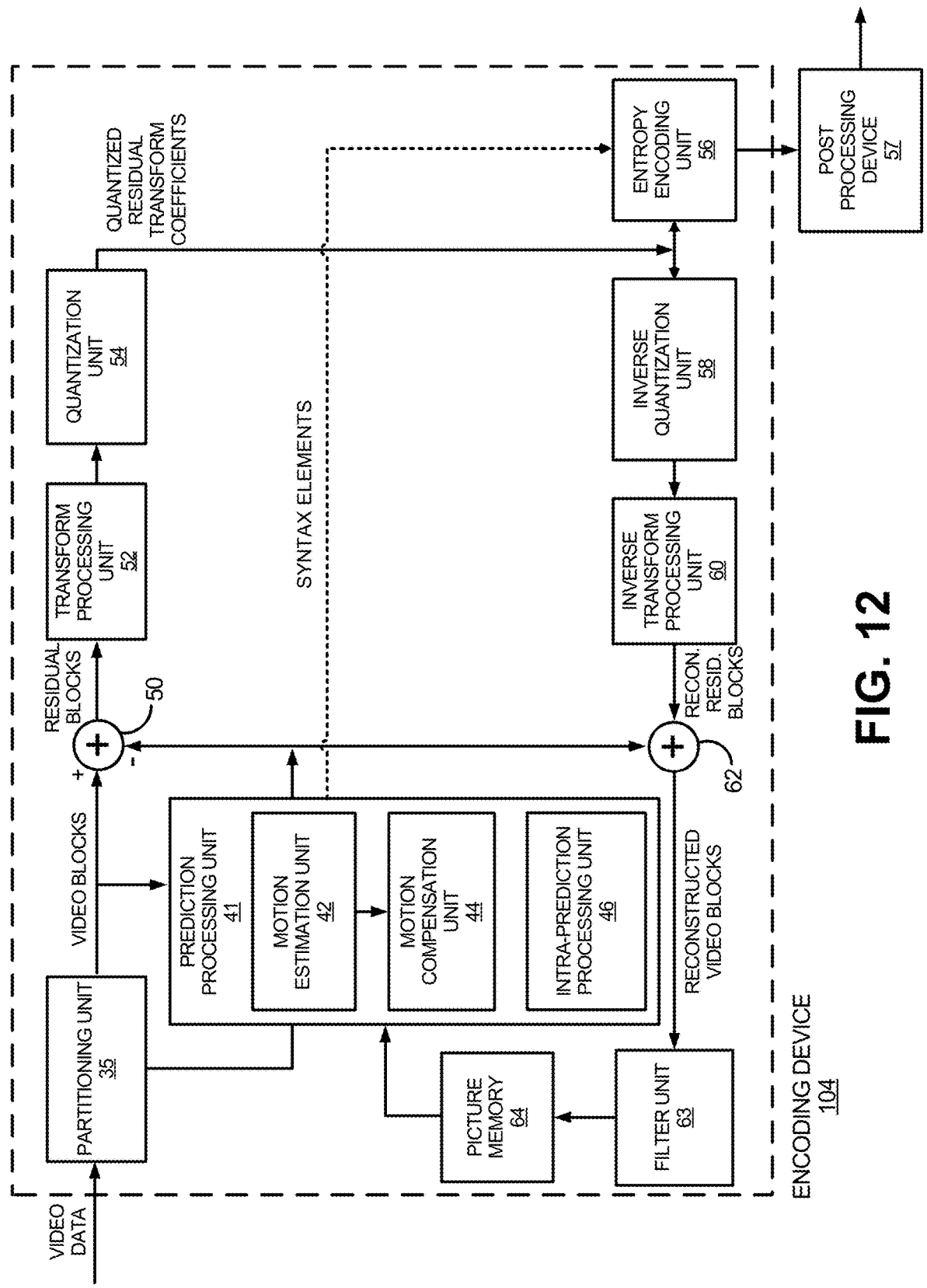
FIG. 12 is a block diagram illustrating an example video encoding device, in accordance with some examples.
Figure 13:
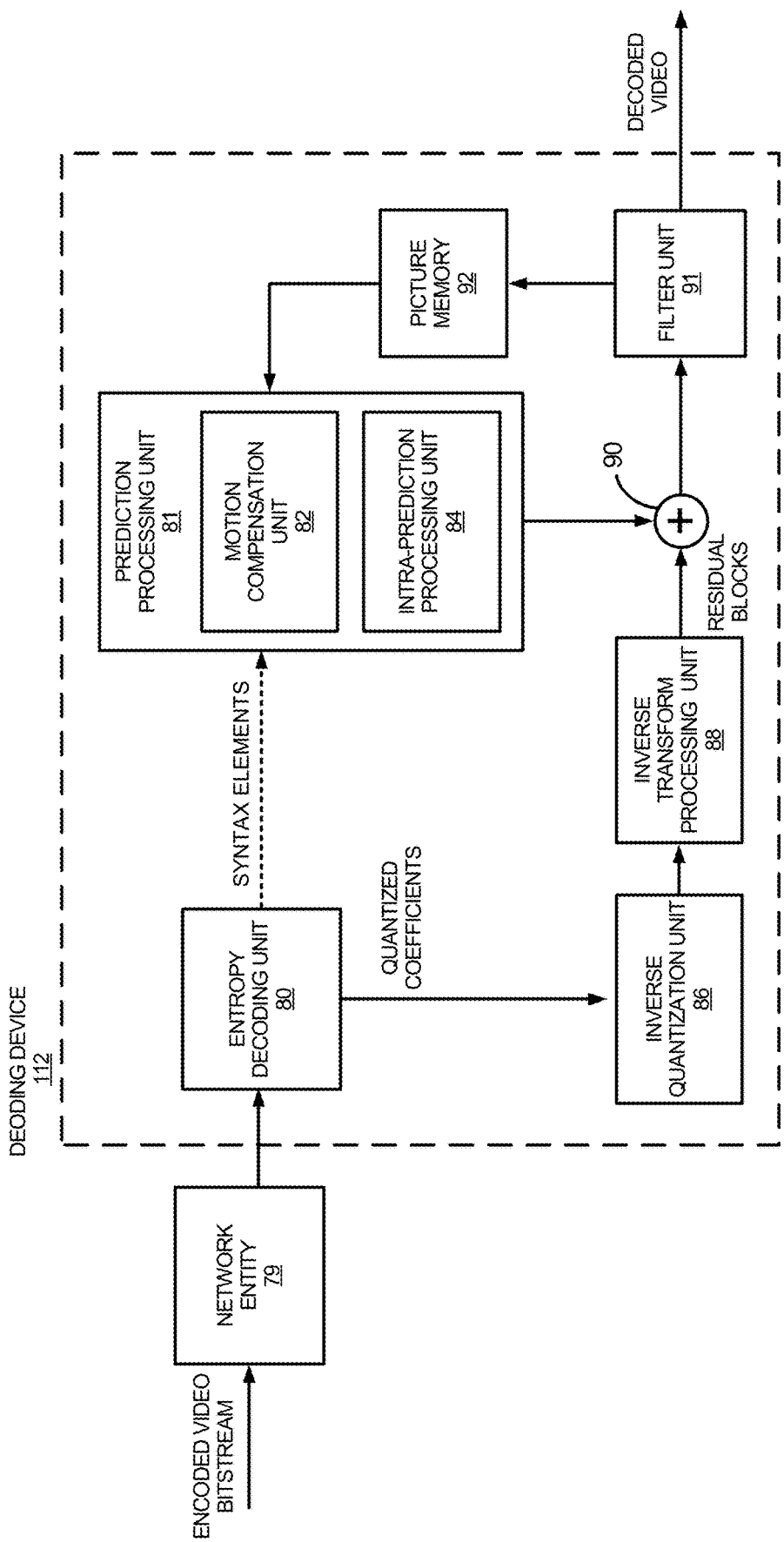
FIG. 13 is a block diagram illustrating an example video decoding device, in accordance with some examples.

Specific details of the encoding device 104 and the decoding device 112 are shown in FIG. 12 and FIG. 13, respectively. FIG. 12 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 12 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 12, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The ncoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

The encoding device 104 may perform any of the techniques described herein. Some techniques of this disclosure have generally been described with respect to the encoding device 104, but as mentioned above, some of the techniques of this disclosure may also be implemented by post processing device 57.

The encoding device 104 of FIG. 12 represents an example of a video encoder configured to perform one or more of the transform coding techniques described herein. The encoding device 104 may perform any of the techniques described herein, including the processes described above with respect to FIG. 11.

FIG. 13 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 12.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in one or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 13 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

The filter unit 91 filters the reconstructed block (e.g. the output of summer 90) and stores the filtered reconstructed block in DPB 94 for uses as a reference block and/or outputs the filtered reconstructed block (decoded video). The reference block may be used by motion compensation unit 82 as a reference block to inter-predict a block in a subsequent video frame or picture. The filter unit 91 may perform any type of filtering such as deblocking filtering, SAO filtering, peak SAO filtering, ALF, and/or GALF, and/or other types of loop filters. A deblocking filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

In addition, the filter unit 91 may be configured to perform any of the techniques in this disclosure related to adaptive loop filtering. For example, as described above, filter unit 91 may be configured to determine parameters for filtering a current block based on parameters for filtering a previous block that were included in the same APS as the current block, a different APS, or pre-defined filters.

The decoding device 112 of FIG. 13 represents an example of a video decoder configured to perform one or more of the transform coding techniques described herein. The decoding device 112 may perform any of the techniques described herein, including the processes described above with respect to FIG. 10.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Example 1

A method of processing video data, the method comprising: obtaining an encoded video bitstream, the encoded video bitstream including a block of video data; and decoding, from the encoded video bitstream, information indicating a mapping of a Residual Differential Pulse Code Modulation (RDPCM) mode for the block to an intra-prediction mode.

Example 2

The method of example 1, further comprising: determining to use the intra-prediction mode for the block based on the information indicating the mapping.

Example 3

The method of any one of examples 1 or 2, further comprising: deriving, based on the intra-prediction mode, a predictor list for one or more blocks of the encoded video bitstream.

Example 4

The method of example 3, wherein the predictor list includes a most probable modes (MPM) list.

Example 5

The method of any one of examples 1 to 4, wherein the intra-prediction mode corresponds to an intra-prediction direction.

Example 6

The method of example 5, wherein the intra-prediction direction includes a horizontal intra-prediction direction.

Example 7

The method of example 5, wherein the intra-prediction direction includes a vertical intra-prediction direction.

Example 8

The method of any one of examples 1 to 5, wherein the RDPCM mode for the block includes a horizontal RDPCM mode, and wherein the information indicates a mapping of the horizontal RDPCM mode to a horizontal intra-prediction direction.

Example 9

The method of any one of examples 1 to 5, wherein the RDPCM mode for the block includes a vertical RDPCM mode, and wherein the information indicates a mapping of the vertical RDPCM mode to a vertical intra-prediction direction.

Example 10

The method of any one of examples 1 to 5, wherein the information indicates a mapping of the RDPCM mode to a PLANAR intra-prediction mode.

Example 11

The method of any one of examples 1 to 5, wherein the information indicates a mapping of the RDPCM mode to a DC intra-prediction mode.

Example 12

An apparatus comprising a memory configured to store video data and a processor configured to process the video data according to any of examples 1 to 11.

Example 13

The apparatus of example 12, wherein the apparatus includes a decoder.

Example 14

The apparatus of any one of examples 12 to 13, wherein the apparatus is a mobile device.

Example 15

The apparatus of any one of examples 12 to 14, further comprising a display configured to display the video data.

Example 16

The apparatus of any one of examples 12 to 15, further comprising a camera configured to capture one or more pictures.

Example 17

A computer readable medium having stored thereon instructions that when executed by a processor perform the methods of any of examples 1 to 11.

Example 18

A method of processing video data, the method comprising: applying a Residual Differential Pulse Code Modulation (RDPCM) mode to a block of video data; determining a mapping of the RDPCM mode to an intra-prediction mode; and generating an encoded video bitstream, the encoded video bitstream including information indicating the mapping of the RDPCM mode to the intra-prediction mode.

Example 19

The method of example 18, wherein the intra-prediction mode is used for the block based on the information indicating the mapping.

Example 20

The method of any one of examples 18 or 19, wherein a predictor list for one or more blocks of the encoded video bitstream are derived based on the intra-prediction mode.

Example 21

The method of example 20, wherein the predictor list includes a most probable modes (MPM) list.

Example 22

The method of any one of examples 18 to 21, wherein the intra-prediction mode corresponds to an intra-prediction direction.

Example 23

The method of example 22, wherein the intra-prediction direction includes a horizontal intra-prediction direction.

Example 24

The method of example 22, wherein the intra-prediction direction includes a vertical intra-prediction direction.

Example 25

The method of any one of examples 18 to 22, wherein the RDPCM mode for the block includes a horizontal RDPCM mode, and wherein the information indicates a mapping of the horizontal RDPCM mode to a horizontal intra-prediction direction.

Example 26

The method of any one of examples 18 to 22, wherein the RDPCM mode for the block includes a vertical RDPCM mode, and wherein the information indicates a mapping of the vertical RDPCM mode to a vertical intra-prediction direction.

Example 27

The method of any one of examples 18 to 22, wherein the information indicates a mapping of the RDPCM mode to a PLANAR intra-prediction mode.

Example 28

The method of any one of examples 18 to 22, wherein the information indicates a mapping of the RDPCM mode to a DC intra-prediction mode.

Example 29

An apparatus comprising a memory configured to store video data and a processor configured to process the video data according to any of examples 18 to 28.

Example 30

The apparatus of examples 29, wherein the apparatus includes an encoder.

Example 31

The apparatus of any one of examples 29 or 30, wherein the apparatus is a mobile device.

Example 32

The apparatus of any one of examples 29 to 31, further comprising a display configured to display the video data.

Example 33

The apparatus of any one of examples 29 to 32, further comprising a camera configured to capture one or more pictures.

Example 34

A computer readable medium having stored thereon instructions that when executed by a processor perform the methods of any of examples 18 to 28.

Example 35

A method of decoding video data, the method comprising: obtaining a first block of a picture included in an encoded video bitstream; determining a second block of the picture is coded using a vertical block-based quantized residual domain pulse code modulation (BDPCM) mode; determining, based on the second block being coded using the vertical BDPCM mode, a vertical intra-prediction mode for an intra-prediction mode list for the first block; and adding the vertical intra-prediction mode to the intra-prediction mode list for the first block.

Example 36

The method of claim 35, wherein the intra-prediction mode list includes a most probable modes (MPM) list.

Example 37

The method of any one of claims 35 to 36, wherein the second block is a neighboring block of the first block in the picture.

Example 38

The method of any one of claims 35 to 37, further comprising: determining, based on information from the encoded video bitstream and based on the intra-prediction mode list, a prediction mode to use for decoding the first block; and decoding the first block using the determined prediction mode.

Example 39

The method of claim 38, wherein the information from the encoded video bitstream includes an intra-prediction mode list flag indicating whether the prediction mode to use for decoding the first block is among a number of prediction modes included in the intra-prediction mode list.

Example 40

The method of claim 39, further comprising: determining, based on a value of the intra-prediction mode list flag, that the prediction mode to use for decoding the first block is among the number of prediction modes included in the intra-prediction mode list; and determining the prediction mode to use for decoding the first block from the intra-prediction mode list.

Example 41

The method of any one of claims 39 to 40, wherein the information in the encoded video bitstream includes an index value associated with the intra-prediction mode list, the method further comprising: determining the prediction mode to use for decoding the first block from the intra-prediction mode list using the index value.

Example 42

The method of any one of claims 35 to 41, wherein the first block is a luma coding block.

Example 43

The method of any one of claims 35 to 42, further comprising: obtaining a third block of the picture included in the encoded video bitstream; determining a fourth block of the picture is coded using a horizontal block-based BDPCM mode; determining, based on the fourth block being coded using the horizontal BDPCM mode, a horizontal intra-prediction mode for an intra-prediction mode list for the third block; and adding the horizontal intra-prediction mode to the intra-prediction mode list for the third block.

Example 44

An apparatus for decoding video data, comprising: a memory configured to store at least one block of the video data; and a video decoder comprising at least one of fixed-function and programmable circuitry. The video decoder is configured to: obtain a first block of a picture included in an encoded video bitstream; determine a second block of the picture is coded using a vertical block-based quantized residual domain pulse code modulation (BDPCM) mode; determine, based on the second block being coded using the vertical BDPCM mode, a vertical intra-prediction mode for an intra-prediction mode list for the first block; and add the vertical intra-prediction mode to the intra-prediction mode list for the first block.

Example 45

The apparatus of claim 44, wherein the intra-prediction mode list includes a most probable modes (MPM) list.

Example 46

The apparatus of any one of claims 44 to 45, wherein the second block is a neighboring block of the first block in the picture.

Example 47

The apparatus of any one of claims 44 to 46, wherein the video decoder is configured to: determine, based on information from the encoded video bitstream and based on the intra-prediction mode list, a prediction mode to use for decoding the first block; and decode the first block using the determined prediction mode.

Example 48

The apparatus of claim 47, wherein the information from the encoded video bitstream includes an intra-prediction mode list flag indicating whether the prediction mode to use for decoding the first block is among a number of prediction modes included in the intra-prediction mode list.

Example 49

The apparatus of claim 48, wherein the video decoder is configured to: determine, based on a value of the intra-prediction mode list flag, that the prediction mode to use for decoding the first block is among the number of prediction modes included in the intra-prediction mode list; and determine the prediction mode to use for decoding the first block from the intra-prediction mode list.

Example 50

The apparatus of any one of claims 48 to 49, wherein the information in the encoded video bitstream includes an index value associated with the intra-prediction mode list, the video decoder being configured to: determine the prediction mode to use for decoding the first block from the intra-prediction mode list using the index value.

Example 51

The apparatus of any one of claims 44 to 50, wherein the first block is a luma coding block.

Example 52

The apparatus of any one of claims 44 to 51, wherein the video decoder is configured to: obtain a third block of the picture included in the encoded video bitstream; determining a fourth block of the picture is coded using a horizontal block-based BDPCM mode; determine, based on the fourth block being coded using the horizontal BDPCM mode, a horizontal intra-prediction mode for an intra-prediction mode list for the third block; and add the horizontal intra-prediction mode to the intra-prediction mode list for the third block.

Example 53

The apparatus of any one of claims 44 to 52, further comprising a display configured to display the video data.

Example 54

The apparatus of any one of claims 44 to 53, wherein the apparatus comprises at least one of a camera, a computer, a mobile device, a broadcast receiver device, and a set-top box.

Example 55

A method of encoding video data, the method comprising: encoding a first block of a picture using a vertical block-based quantized residual domain pulse code modulation (BDPCM) mode; obtaining a second block of the picture; determining, based on the first block being encoded using the vertical BDPCM mode, a vertical intra-prediction mode for an intra-prediction mode list for the second block; adding the vertical intra-prediction mode to the intra-prediction mode list for the second block; and generating an encoded video bitstream including the first block, the second block, and the intra-prediction mode list.

Example 56

The method of claim 55, wherein the intra-prediction mode list includes a most probable modes (MPM) list.

Example 57

The method of any one of claims 55 to 56, wherein the second block is a neighboring block of the first block in the picture.

Example 58

The method of any one of claims 55 to 57, further comprising: including, in the encoded video bitstream, information indicative of a prediction mode to use for decoding the first block.

Example 59

The method of claim 58, wherein the information includes an intra-prediction mode list flag indicating whether the prediction mode to use for decoding the first block is among a number of prediction modes included in the intra-prediction mode list.

Example 60

The method of any one of claims 58 to 59, wherein the information includes an index value indicating the prediction mode from the intra-prediction mode list to use for decoding the first block.

Example 61

The method of any one of claims 55 to 60, wherein the first block is a luma coding block.

Example 62

The method of any one of claims 55 to 61, further comprising: encoding a third block of the picture using a horizontal block-based BDPCM mode; obtaining a fourth block of the picture; determining, based on the third block being coded using the horizontal BDPCM mode, a horizontal intra-prediction mode for an intra-prediction mode list for the fourth block; and adding the horizontal intra-prediction mode to the intra-prediction mode list for the fourth block.

Example 63

An apparatus for encoding video data, comprising: a memory configured to store at least one block of the video data; and a video encoder comprising at least one of fixed-function and programmable circuitry. The video encoder being configured to: encode a first block of a picture using a vertical block-based quantized residual domain pulse code modulation (BDPCM) mode; obtain a second block of the picture; determine, based on the first block being encoded using the vertical BDPCM mode, a vertical intra-prediction mode for an intra-prediction mode list for the second block; add the vertical intra-prediction mode to the intra-prediction mode list for the second block; and generate an encoded video bitstream including the first block, the second block, and the intra-prediction mode list.

Example 64

The apparatus of claim 63, wherein the intra-prediction mode list includes a most probable modes (MPM) list.

Example 65

The apparatus of any one of claims 63 to 64, wherein the second block is a neighboring block of the first block in the picture.

Example 66

The apparatus of any one of claims 64 to 65, wherein the video encoder is configured to: include, in the encoded video bitstream, information indicative of a prediction mode to use for decoding the first block.

Example 67

The apparatus of claim 66, wherein the information includes an intra-prediction mode list flag indicating whether the prediction mode to use for decoding the first block is among a number of prediction modes included in the intra-prediction mode list.

Example 68

The apparatus of any one of claims 66 to 67, wherein the information includes an index value indicating the prediction mode from the intra-prediction mode list to use for decoding the first block.

Example 69

The apparatus of any one of claims 63 to 68, wherein the first block is a luma coding block.

Example 70

The apparatus of any one of claims 63 to 69, wherein the video encoder is configured to: encode a third block of the picture using a horizontal block-based BDPCM mode; obtain a fourth block of the picture; determine, based on the third block being coded using the horizontal BDPCM mode, a horizontal intra-prediction mode for an intra-prediction mode list for the fourth block; and add the horizontal intra-prediction mode to the intra-prediction mode list for the fourth block.

Example 71

The apparatus of any one of claims 63 to 70, the apparatus comprises one or more of a camera, a computer, a mobile device, a broadcast receiver device, or a set-top box.

What is claimed is:

1. A method of decoding video data, the method comprising:
   obtaining a first block of a picture included in an encoded video bitstream;
   determining that a second block of the picture is coded using a vertical block-based quantized residual domain pulse code modulation (BDPCM) mode;
   determining a vertical intra-prediction mode for adding to an intra-prediction mode list for the first block based on a mapping between the vertical BDPCM mode and the vertical intra-prediction mode; and
   adding the vertical intra-prediction mode to the intra-prediction mode list for the first block.

2. The method of claim 1, wherein the intra-prediction mode list includes a most probable modes (MPM) list.

3. The method of claim 1, wherein the second block is a neighboring block of the first block in the picture.

4. The method of claim 1, further comprising:
   determining, based on information from the encoded video bitstream and based on the intra-prediction mode list, a prediction mode to use for decoding the first block; and decoding the first block using the determined prediction mode.

5. The method of claim 4, wherein the information from the encoded video bitstream includes an intra-prediction mode list flag indicating whether the prediction mode to use for decoding the first block is among a number of prediction modes included in the intra-prediction mode list.

6. The method of claim 5, further comprising:
determining, based on a value of the intra-prediction mode list flag, that the prediction mode to use for decoding the first block is among the number of prediction modes included in the intra-prediction mode list; and
determining the prediction mode to use for decoding the first block from the intra-prediction mode list.

7. The method of claim 6, wherein the information in the encoded video bitstream includes an index value associated with the intra-prediction mode list, the method further comprising:
determining the prediction mode to use for decoding the first block from the intra-prediction mode list using the index value.

8. The method of claim 1, wherein the first block is a luma coding block.

9. The method of claim 1, further comprising:
obtaining a third block of the picture included in the encoded video bitstream;
determining a fourth block of the picture is coded using a horizontal BDPCM mode;
determining, based on the fourth block being coded using the horizontal BDPCM mode, a horizontal intra-prediction mode for an intra-prediction mode list for the third block; and
adding the horizontal intra-prediction mode to the intra-prediction mode list for the third block.

10. The method of claim 9, wherein the vertical horizontal intra-prediction mode is determined for the intra-prediction mode list for the third block based on a mapping between the horizontal BDPCM mode and the horizontal intra-prediction mode.

11. An apparatus for decoding video data, comprising:
a memory configured to store at least one block of the video data; and
a video decoder comprising at least one of fixed-function and programmable circuitry, the video decoder being configured to:
obtain a first block of a picture included in an encoded video bitstream;
determine that a second block of the picture is coded using a vertical block-based quantized residual domain pulse code modulation (BDPCM) mode;
determine a vertical intra-prediction mode for adding to an intra-prediction mode list for the first block based on a mapping between the vertical BDPCM mode and the vertical intra-prediction mode; and
add the vertical intra-prediction mode to the intra-prediction mode list for the first block.

12. The apparatus of claim 11, wherein the intra-prediction mode list includes a most probable modes (MPM) list.

13. The apparatus of claim 11, wherein the second block is a neighboring block of the first block in the picture.

14. The apparatus of claim 11, wherein the video decoder is configured to:
determine, based on information from the encoded video bitstream and based on the intra-prediction mode list, a prediction mode to use for decoding the first block; and
decode the first block using the determined prediction mode.

15. The apparatus of claim 14, wherein the information from the encoded video bitstream includes an intra-prediction mode list flag indicating whether the prediction mode to use for decoding the first block is among a number of prediction modes included in the intra-prediction mode list.

16. The apparatus of claim 15, wherein the video decoder is configured to:
determine, based on a value of the intra-prediction mode list flag, that the prediction mode to use for decoding the first block is among the number of prediction modes included in the intra-prediction mode list; and
determine the prediction mode to use for decoding the first block from the intra-prediction mode list.

17. The apparatus of claim 16, wherein the information in the encoded video bitstream includes an index value associated with the intra-prediction mode list, the video decoder being configured to:
determine the prediction mode to use for decoding the first block from the intra-prediction mode list using the index value.

18. The apparatus of claim 11, wherein the first block is a luma coding block.

19. The apparatus of claim 11, wherein the video decoder is configured to:
obtain a third block of the picture included in the encoded video bitstream;
determining a fourth block of the picture is coded using a horizontal BDPCM mode;
determine, based on the fourth block being coded using the horizontal BDPCM mode, a horizontal intra-prediction mode for an intra-prediction mode list for the third block; and
add the horizontal intra-prediction mode to the intra-prediction mode list for the third block.

20. The apparatus of claim 19, wherein the horizontal intra-prediction mode is determined for the intra-prediction mode list for the third block based on a mapping between the horizontal BDPCM mode and the horizontal intra-prediction mode.

21. The apparatus of claim 11, further comprising a display configured to display the video data.

22. The apparatus of claim 11, wherein the apparatus comprises at least one of a camera, a computer, a mobile device, a broadcast receiver device, and a set-top box.

23. A method of encoding video data, the method comprising:
encoding a first block of a picture using a vertical block-based quantized residual domain pulse code modulation (BDPCM) mode;
obtaining a second block of the picture;
determining a vertical intra-prediction mode for adding to an intra-prediction mode list for the second block based on a mapping between the vertical BDPCM mode and the vertical intra-prediction mode;
adding the vertical intra-prediction mode to the intra-prediction mode list for the second block; and
generating an encoded video bitstream including information associated with the intra-prediction mode list.

24. The method of claim 23, wherein the intra-prediction mode list includes a most probable modes (MPM) list.

25. The method of claim 23, wherein the second block is a neighboring block of the first block in the picture.

26. The method of claim 23, wherein the information associated with the intra-prediction mode list is indicative of a prediction mode to use for decoding the first block.

27. The method of claim 26, wherein the information includes an intra-prediction mode list flag indicating whether the prediction mode to use for decoding the first block is among a number of prediction modes included in the intra-prediction mode list.

28. The method of claim 27, wherein the information includes an index value indicating the prediction mode from the intra-prediction mode list to use for decoding the first block.

29. The method of claim 23, wherein the second block is a luma coding block.

30. The method of claim 23, further comprising:
encoding a third block of the picture using a horizontal BDPCM mode;
obtaining a fourth block of the picture;
determining, based on the third block being coded using the horizontal BDPCM mode, a horizontal intra-prediction mode for an intra-prediction mode list for the fourth block; and
adding the horizontal intra-prediction mode to the intra-prediction mode list for the fourth block.

31. The method of claim 30, wherein the horizontal intra-prediction mode is determined for the intra-prediction mode list for the fourth block based on a mapping between the horizontal BDPCM mode and the horizontal intra-prediction mode.

32. An apparatus for encoding video data, comprising:
a memory configured to store at least one block of the video data; and
a video encoder comprising at least one of fixed-function and programmable circuitry, the video encoder being configured to:
encode a first block of a picture using a vertical block-based quantized residual domain pulse code modulation (BDPCM) mode;
obtain a second block of the picture;
determine a vertical intra-prediction mode for adding to an intra-prediction mode list for the second block based on a mapping between the vertical BDPCM mode and the vertical intra-prediction mode;
add the vertical intra-prediction mode to the intra-prediction mode list for the second block; and
generate an encoded video bitstream including information associated with the intra-prediction mode list.

33. The apparatus of claim 32, wherein the intra-prediction mode list includes a most probable modes (MPM) list.

34. The apparatus of claim 32, wherein the second block is a neighboring block of the first block in the picture.

35. The apparatus of claim 32, wherein the video encoder is configured to:
wherein the information associated with the intra-prediction mode list is information indicative of a prediction mode to use for decoding the first block.

36. The apparatus of claim 35, wherein the information includes an intra-prediction mode list flag indicating whether the prediction mode to use for decoding the first block is among a number of prediction modes included in the intra-prediction mode list.

37. The apparatus of claim 36, wherein the information includes an index value indicating the prediction mode from the intra-prediction mode list to use for decoding the first block.

38. The apparatus of claim 32, wherein the second block is a luma coding block.

39. The apparatus of claim 32, wherein the video encoder is configured to:
encode a third block of the picture using a horizontal BDPCM mode;
obtain a fourth block of the picture;
determine, based on the third block being coded using the horizontal BDPCM mode, a horizontal intra-prediction mode for an intra-prediction mode list for the fourth block; and
add the horizontal intra-prediction mode to the intra-prediction mode list for the fourth block.

40. The apparatus of claim 39, wherein the horizontal intra-prediction mode is determined for the intra-prediction mode list for the fourth block based on a mapping between the horizontal BDPCM mode and the horizontal intra-prediction mode.

41. The apparatus of claim 32, wherein the apparatus comprises one or more of a camera, a computer, a mobile device, a broadcast receiver device, or a set-top box.

* * * * *

UNITED STATES PATENT AND TRADEMARK OFFICE
CERTIFICATE OF CORRECTION

PATENT NO. : 11,190,758 B2  
APPLICATION NO. : 16/854720  
DATED : November 30, 2021  
INVENTOR(S) : Muhammed Zeyd Coban, Geert Van der Auwera and Marta Karczewicz Page 1 of 1

It is certified that error appears in the above-identified patent and that said Letters Patent is hereby corrected as shown below:

In the Claims

Column 49, Line 37 Claim 10, delete the word "vertical"

Signed and Sealed this  
Twenty-first Day of January, 2025

Coke Morgan Stewart  
*Acting Director of the United States Patent and Trademark Office*